US009667906B2

(12) United States Patent
Yeo et al.

(10) Patent No.: US 9,667,906 B2
(45) Date of Patent: May 30, 2017

(54) DISPLAY APPARATUS

(71) Applicant: LG ELECTRONICS INC., Seoul (KR)

(72) Inventors: Simdong Yeo, Seoul (KR); Kisang Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 14/529,330

(22) Filed: Oct. 31, 2014

(65) Prior Publication Data

US 2016/0014367 A1 Jan. 14, 2016

(30) Foreign Application Priority Data

Jul. 9, 2014 (KR) ........................ 10-2014-0085928

(51) Int. Cl.
  *H04N 5/64* (2006.01)
  *H04R 1/34* (2006.01)
(52) U.S. Cl.
  CPC ............. *H04N 5/642* (2013.01); *H04R 1/345* (2013.01); *H04R 2499/15* (2013.01)
(58) Field of Classification Search
  CPC ........... H04N 5/64; H04N 5/642; H04N 5/645
  See application file for complete search history.

(56) References Cited

U.S. PATENT DOCUMENTS

| | | | | |
|---|---|---|---|---|
| 4,190,739 A * | 2/1980 | Torffield | ................ | H04R 5/02 181/155 |
| 2006/0187364 A1* | 8/2006 | Fukano | ................ | H04N 5/642 348/836 |
| 2008/0165991 A1 | 7/2008 | Shyu et al. | | |
| 2010/0272307 A1 | 10/2010 | Okumura | | |
| 2014/0131225 A1* | 5/2014 | Couch, III | ............. | A45C 11/00 206/45.24 |
| 2015/0053497 A1* | 2/2015 | Horiuchi | ................ | H04N 5/642 181/199 |
| 2015/0098601 A1* | 4/2015 | Absher | .................. | H04R 1/345 381/352 |
| 2016/0105740 A1* | 4/2016 | Suzuki | .................. | H04R 1/028 381/333 |

OTHER PUBLICATIONS

European Search Repost issued in Application No. 14003382.0 dated Jan. 16, 2015.

* cited by examiner

*Primary Examiner* — William C Vaughn, Jr.
*Assistant Examiner* — Lindsay Uhl
(74) *Attorney, Agent, or Firm* — KED & Associates LLP

(57) ABSTRACT

A display apparatus may be provided that includes a display module, a housing, at least one speaker module within the housing, and at least one reflector disposed adjacent to the at least one speaker module. The at least one reflector may have an inclined acoustic reflection surface exposed to a front side of the display module when the sounds are emitted from the at least one speaker module. The at least one speaker module may be disposed in parallel to a horizontal or vertical direction of the housing.

21 Claims, 30 Drawing Sheets

DISPLAY APPARATUS

CROSS-REFERENCE TO RELATED APPLICATION

The present application claims the benefits of priority from Korean Patent Application No. 10-2014-0085928, filed Jul. 9, 2014, the subject matter at which is hereby incorporated by reference.

BACKGROUND

The present disclosure may relate to a display apparatus, and more particularly, to a display apparatus including a speaker module for emitting sounds.

Display apparatuses may be apparatuses for visually displaying images. A display apparatus may include a speaker module for emitting sounds. Display apparatuses may feature flat panel display apparatuses having a thin thickness. In recent years, curved display apparatuses that are capable of increasing in user's immersion may be gradually coming on the markets.

U.S. Pat. No. 7,652,724 discloses a display apparatus. The display apparatus may include a housing defining an exterior, a display module mounted on the housing to display an image, and a speaker module inclinedly mounted within the housing and electrically connected to the display module to emit sounds. The housing may include a back cover for accommodating the display module and the speaker module, and a border cover coupled to the back cover.

In the display apparatus, a lower portion of the border cover spaced apart from a front lower side of the display module may function as a reflector for reflecting the sounds emitted from the speaker module to a front side of the display module.

However, since the front lower portion of the display apparatus may be always opened by the border cover in the display apparatus, it may appear like a front bezel is relatively widened to deteriorate beauty of the display apparatus.

Further, in the display apparatus, since the speaker module is inclinedly, a volume occupied by the speaker module within the housing may increase. Thus, a side bezel of the display apparatus may also increase in thickness to hinder slimness of the display apparatus.

BRIEF DESCRIPTION OF THE DRAWINGS

Arrangements and embodiments may be described in detail with reference to the following drawings in which like reference numerals refer to like elements and wherein.

DETAILED DESCRIPTION

Exemplary embodiments of the present disclosure may be described below in more detail with reference to the accompanying drawings. The description of the present disclosure is intended to be illustrative, and those with ordinary skill in the technical field of the present disclosure pertains will be understood that the present disclosure can be carried out in other specific forms without changing the technical idea or essential features. Additionally, for helping understanding of the embodiments, the drawings are not to actual scale, but are partially exaggerated in size.

A display apparatus may include a display for displaying an image to visually display the image. The display apparatus may include various apparatuses for displaying an image such as televisions, monitors, laptop PCs, Tablet PCs, Smartphones, personal digital assistants, E-book readers, electronic picture frames, kiosks, and etc. The television may be described as an example of the display apparatus according to an example embodiment.

Figure 1:
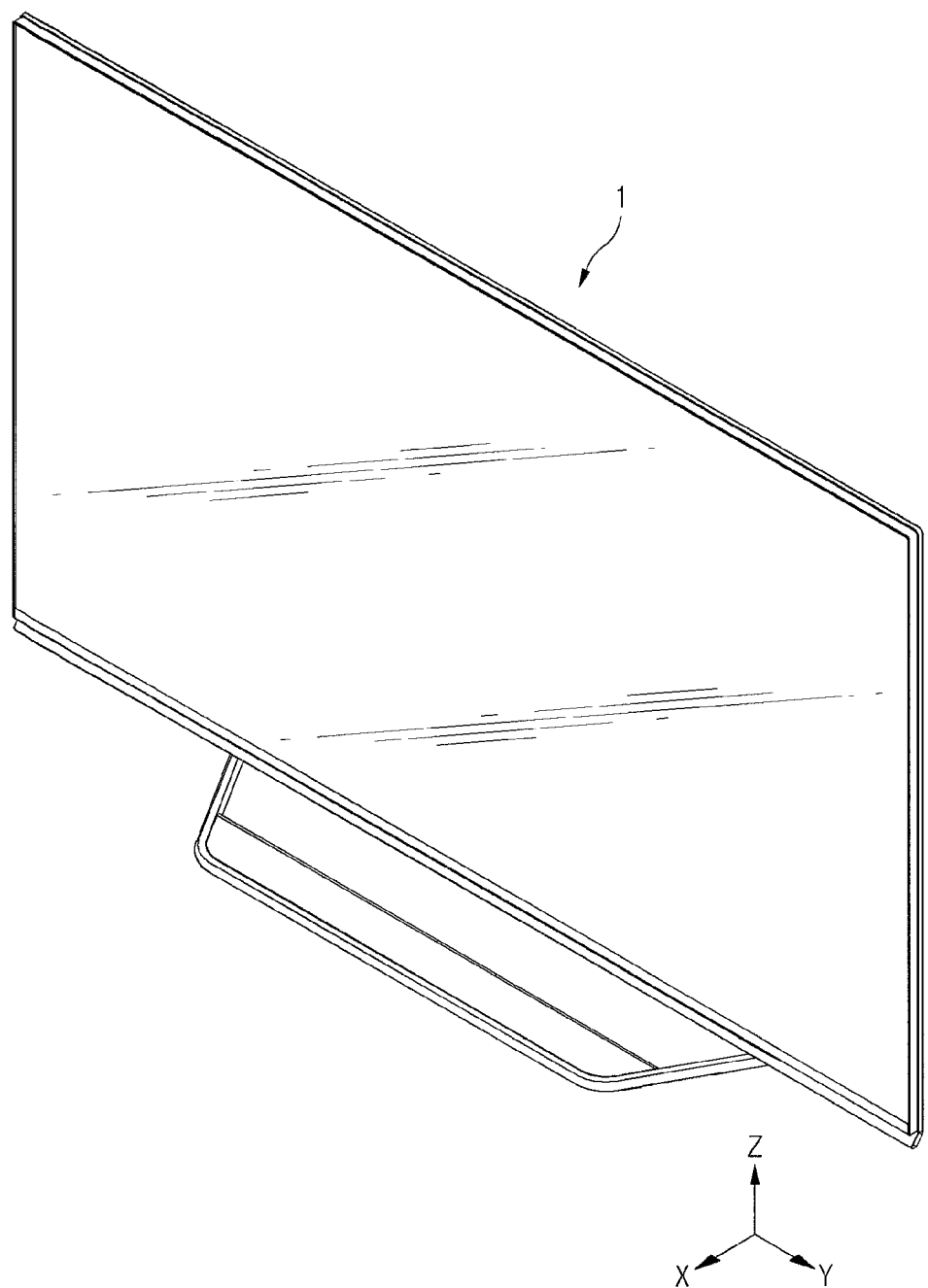
FIG. 1 is a perspective view of a display apparatus according to an example embodiment.
Figure 2:
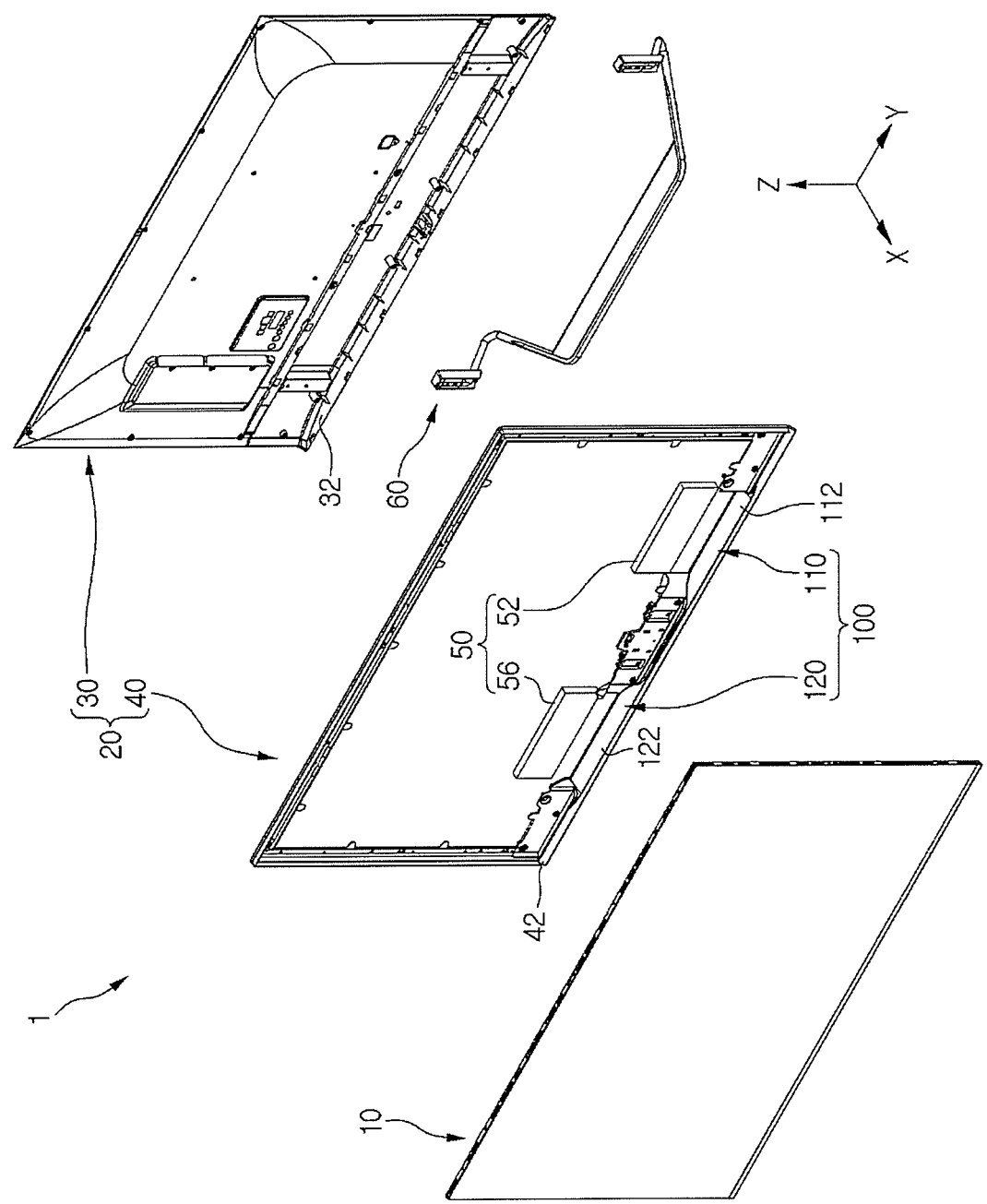
FIG. 2 is an exploded perspective view of the display apparatus of FIG. 1.
Figure 3:
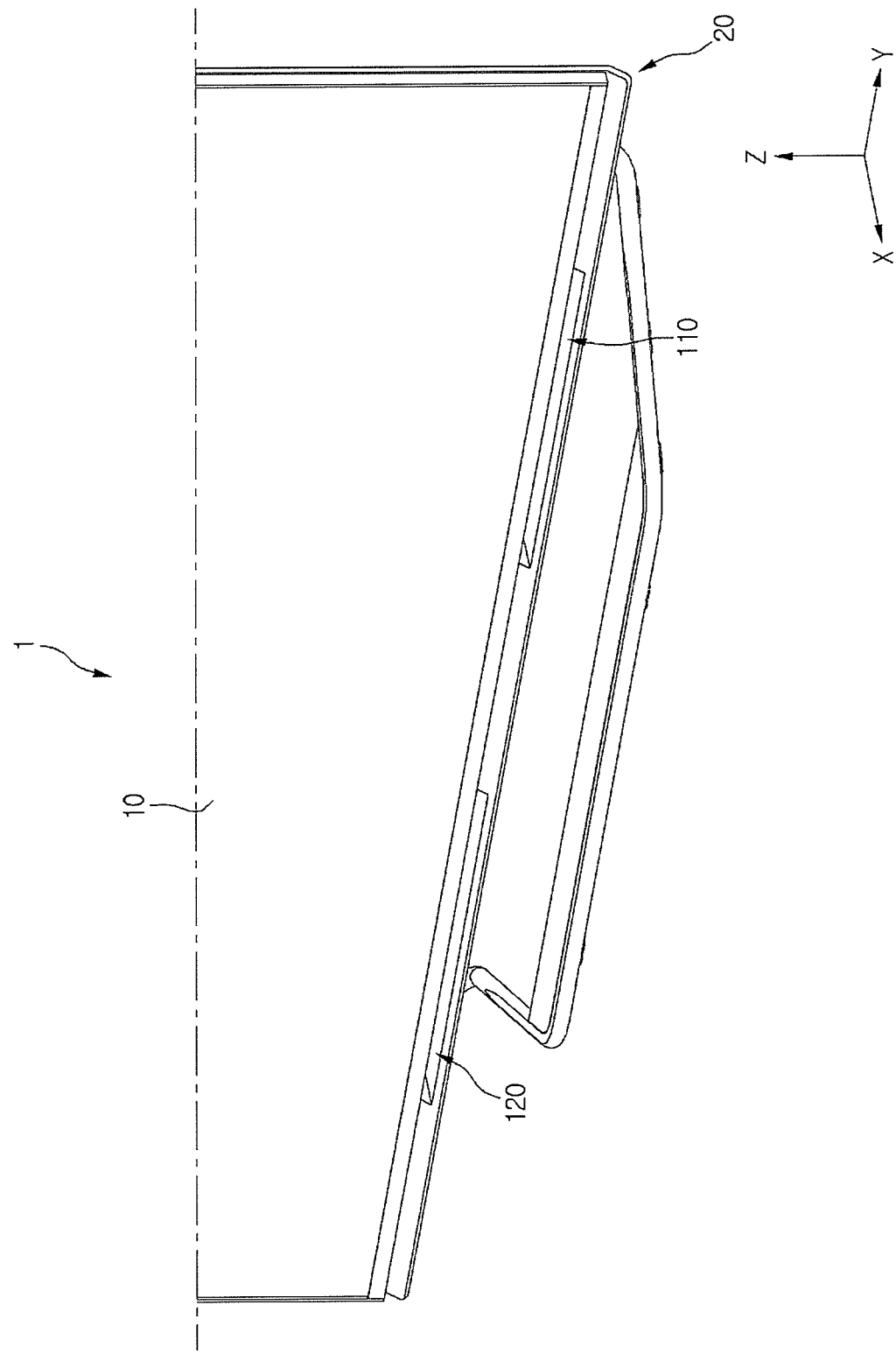
FIG. 3 is a view of a main part of the display apparatus of FIG. 1.
Figure 6:
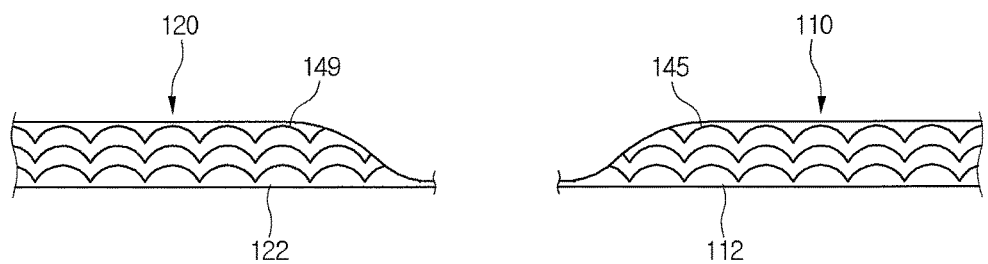
Figure 7:
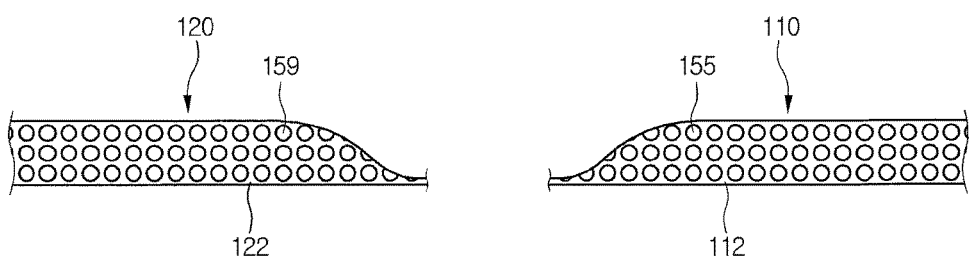
Figure 8:
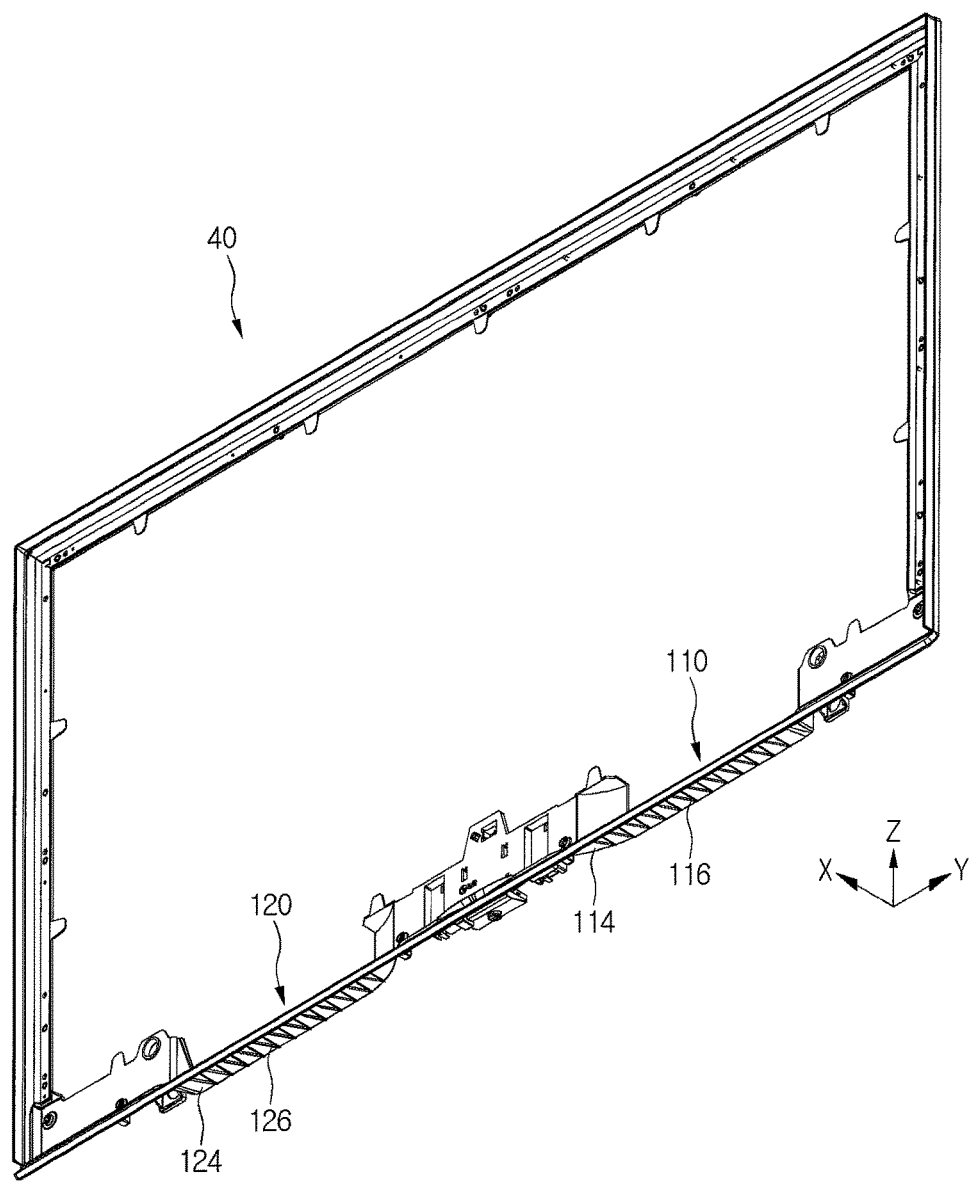
FIG. 8 is a bottom perspective view illustrating a border cover of the display apparatus of FIG. 2.
Figure 9:
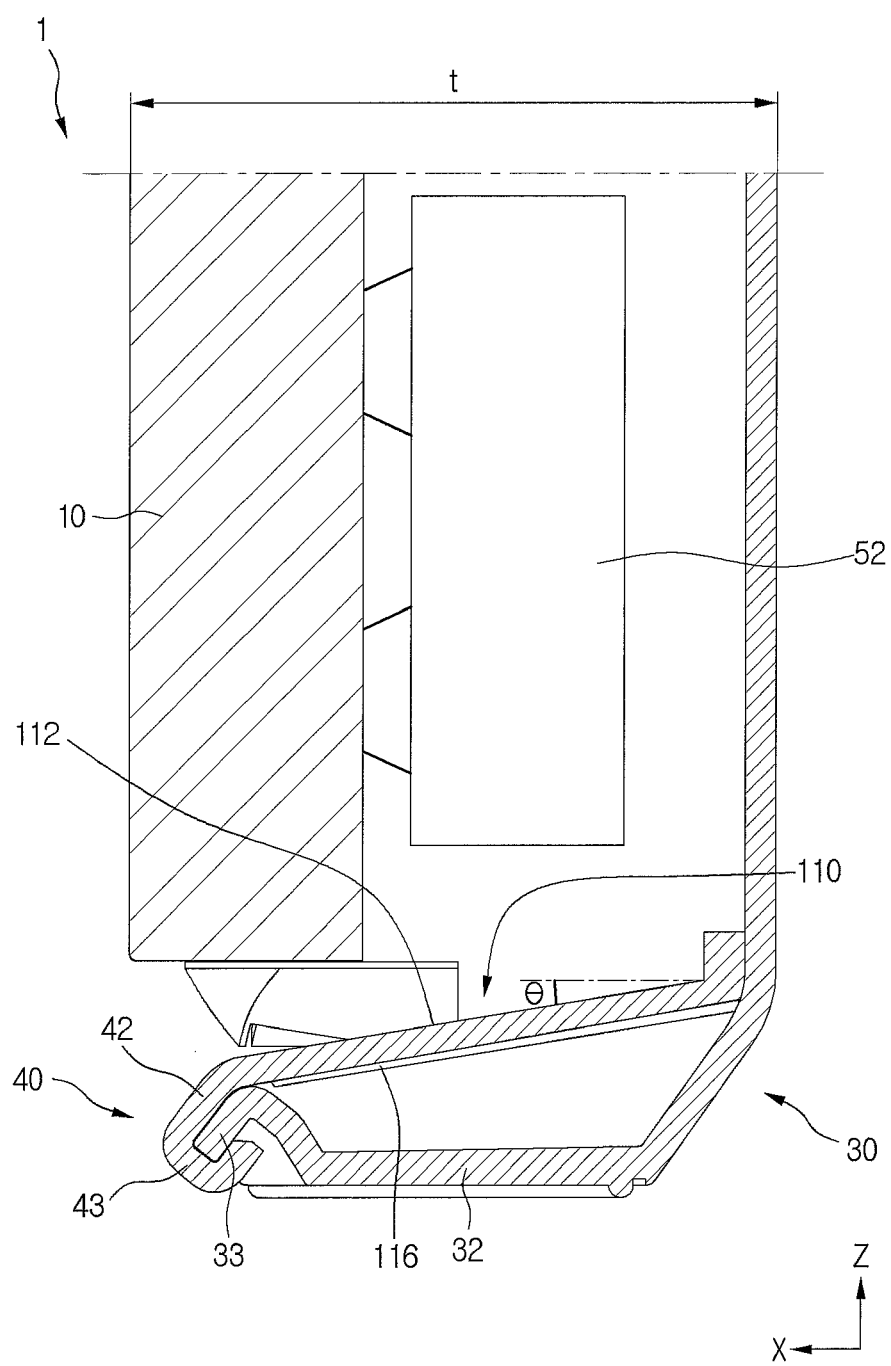
FIG. 9 is a side cross-sectional view of the display apparatus of FIG. 2.
Figure 10:
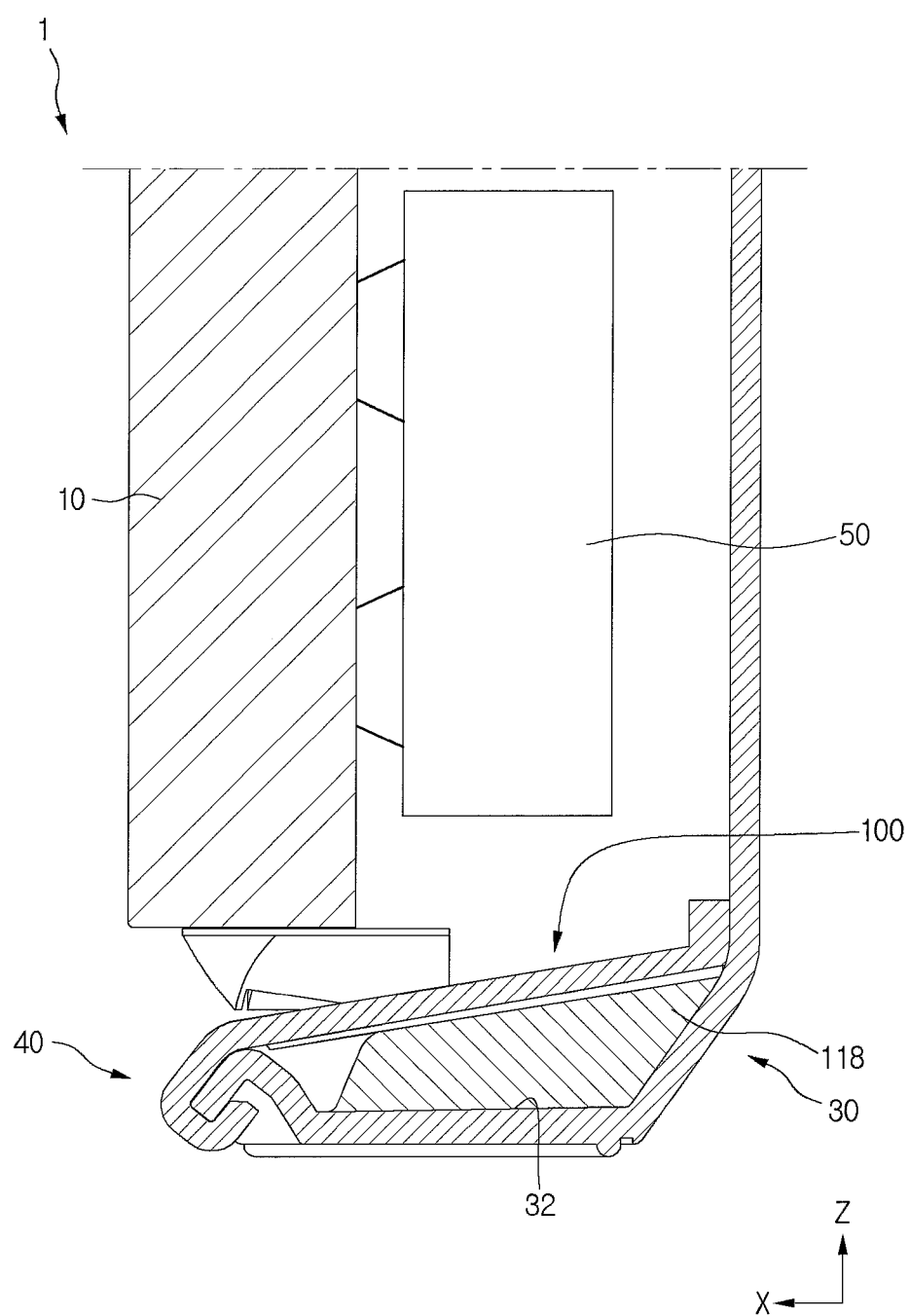
FIG. 10 is a side cross-sectional view illustrating a modified example of the display apparatus of FIG. 2.
Figure 11:
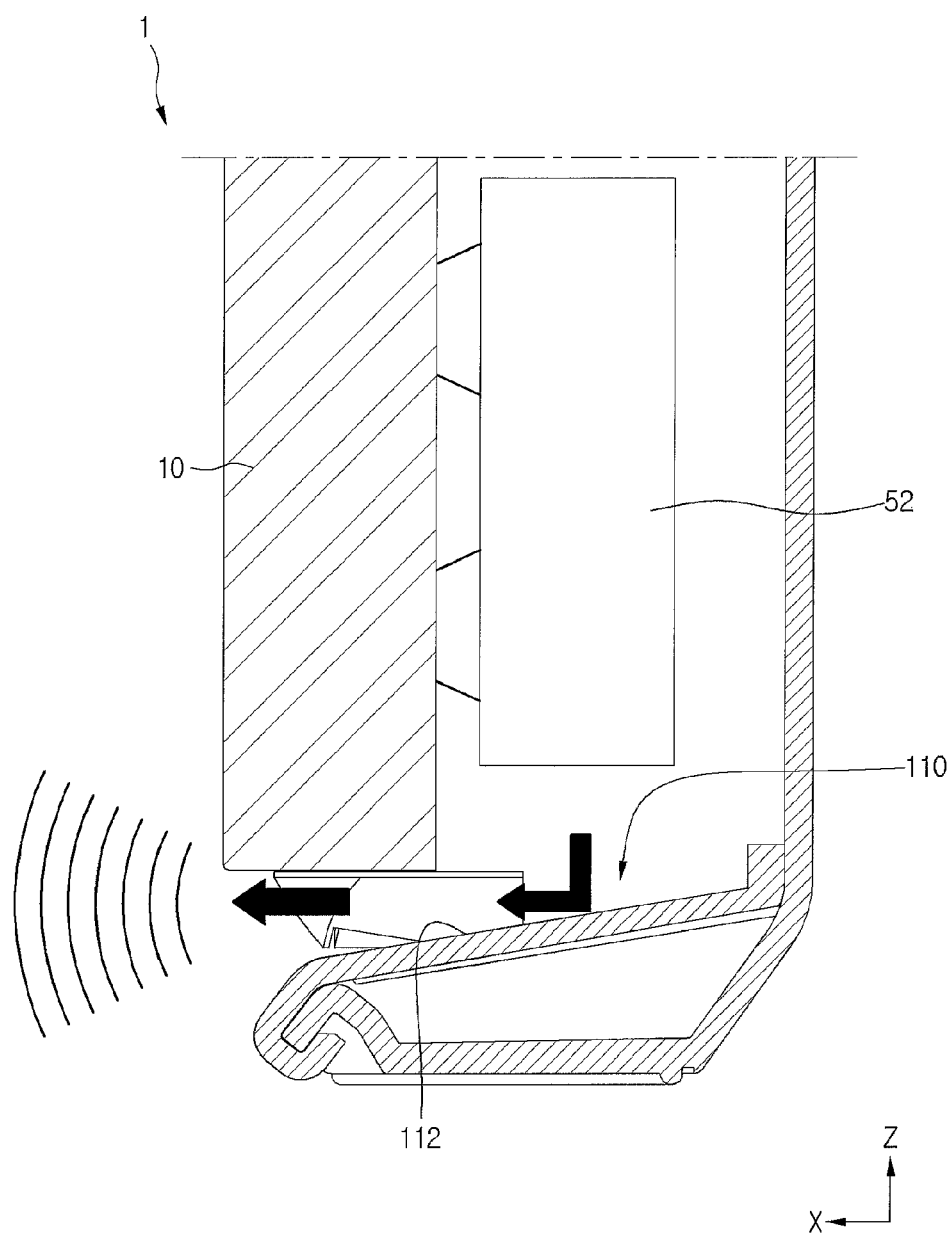
FIG. 11 is a view for explaining acoustic emission of the display apparatus of FIG. 2.

FIG. 1 is a perspective view of a display apparatus according to an example embodiment. FIG. 2 is an exploded perspective view of the display apparatus of FIG. 1. FIG. 3 is a view illustrating a main part of the display apparatus of FIG. 1. FIGS. 4 to 7 are views for explaining various diffusion patterns of a reflector of the display apparatus of FIG. 2. FIG. 8 is a bottom perspective view illustrating a border cover of the display apparatus of FIG. 2. FIG. 9 is a side cross-sectional view of the display apparatus of FIG. 2. FIG. 10 is a side cross-sectional view illustrating a modified example of the display apparatus of FIG. 2. FIG. 11 is a view for explaining acoustic emission of the display apparatus of FIG. 2. Other embodiments and configurations may also be provided.

Referring to FIGS. 1 to 9, a display apparatus 1 may include a display module 10, a housing 20, a speaker module 50, a stand 60, and a reflector 100.

The display module 10 may display an image and include various display modules for display an image. The display module 10 may include one of a plasma display panel (PDP) module, a liquid crystal display (LCD) module, a light emitting diode (LED) module, and an organic light emitting diode (OLED) module as a flat panel display. For example, when the display module 10 is the LCD module, the display module 10 may include a liquid crystal panel for displaying an image and a backlight unit for supplying light to the liquid crystal panel. Further, the display module 10 may include a curved display or a flexible display, but may also include the flat panel display. The display module 10 may also include a touch-type display.

The housing 20 may accommodate the display module 10 and the speaker module 50. The housing 20 may also accommodate various components constituting the display apparatus 1, for example, a power board for supplying a power to the display apparatus 1 and a control board for controlling the display apparatus 1.

The housing 20 may include a back cover 30 and a border cover 40.

The back cover 30 is disposed on a rear side (a −X axis direction) of the display module 10 to provide an accommodation space for accommodating various components of the display apparatus 1. The back cover 30 may be divided into an upper cover and a lower cover and thus may be provided as two members, or the back cover 30 may be provided as a single member.

The border cover 40 may be disposed on a front side (+X axis direction) of the back cover 30 and may be coupled to the back cover 30. The border cover 40 may define a side border of the housing 20. Alternatively, according to design of the border cover 40, the border cover 40 may be integrated with the back cover 30.

When the border cover 40 and the back cover 30 are coupled to each other, a bottom part 42 of the border cover 40 may be hook-coupled to a bottom part 32 of the back cover 30 and may be disposed above the bottom part 32 of the back cover 30. For the hook-coupling, a plurality of hooks 33 and 43 are disposed on each of the bottom part 32 of the back cover 30 and the bottom part 42 of the border cover 40. Each of the hooks 33 disposed on the bottom part 32 (of the back cover 30) may be disposed at a position corresponding to that of each of the hooks 43 disposed on the bottom part 42 (of the border cover 40). A portion of the hooks 43 of the bottom part 42 (of the border cover 40) is disposed on a front side (the +X axis direction) of the reflector 100. Thus, the reflector 100 may be more firmly supported by the back cover 30 due to the hooks 43 and 33 of the border cover 40 and the back cover 30, which are hook-coupled to each other in the front side (the +X axis direction) of the reflector 100 when the border cover 40 and the back cover 30 are coupled to each other.

The speaker module 50 may emit sounds and may be mounted within the housing 20. The speaker module 50 may be electrically connected to the display module 10 and may be disposed on a rear side of the display module 10. The speaker module 50 may be mounted within the housing 20 along a vertical direction (a Z axis direction) of the housing 20 to emit sounds downward (a −Z axis direction). That is, the speaker module 50 is disposed in parallel to the vertical direction (the Z axis direction) of the housing 20.

Since the speaker module 50 is disposed as described above, a space occupied by the speaker module within the housing 20 in a lateral direction (the X axis direction) of the housing 20 may be reduced. Thus, in the current example embodiment, a thickness t of the housing 20 in the lateral direction (the X axis direction) may be relatively reduced.

The speaker module 50 may be provided as one or as a plurality. When the speaker module 50 is provided in plurality, a stereophonic sound (such as stereo mode or Dolby stereo mode) may be realized. In the current example embodiment, the two speaker modules 50 may be provided.

The two speaker modules 50 may include a first speaker module 52 and a second speaker module 56.

The first speaker module 52 may be disposed on one side within the housing 20, and more particularly at a right lower side within the housing 20. The first speaker module 52 may be disposed in parallel to the vertical direction (i.e., the Z axis direction) of the housing 20 to emit sounds downward (i.e., a −Z axis direction) from the right lower side within the housing 20.

The second speaker module 56 may be spaced a predetermined distance from the first speaker module 52 in the horizontal direction (i.e., the Y axis direction) and may be disposed on the other side within the housing 20, and more particularly at a left lower side within the housing 20. More specifically, the second speaker module 56 may be disposed in parallel to the vertical direction (i.e., the Z axis direction) of the housing 20 to emit sounds downward (i.e., the −Z axis direction) from the left lower side within the housing 20.

The stand 60 may support the display apparatus 1. The stand 60 may be mounted on a rear surface of the housing 20, and more particularly on a rear surface of the back cover 30. According to a design of the stand 60, the stand 60 may be provided as a wall-mount type stand. In the current example embodiment, a ground stand that is installed on the ground may be described as an example.

The reflector 100 may reflect the emitted sounds to the front side (the +X axis direction) of the display apparatus 1 when the speaker module 50 emits the sounds. The reflector 100 may be exposed to the front side (the +X axis direction) of the display module 10, and more particularly may be exposed at the front lower side of the display module 10.

The reflector 100 may be disposed on the bottom part 42 of the border cover 40 disposed on the front lower side of the display module 10, and the reflector 100 may also be disposed adjacent to the speaker module 50. More, the reflector 100 may be disposed close to a portion of the speaker module 50, which emits the sounds, at the lower side (the −Z direction) of the speaker module 50.

The reflector 100 may be provided in numbers corresponding to that of the speaker module 50. That is, if one speaker module 50 is provided, then one reflector 100 may be provided. On the other hand, if a plurality of speaker modules 50 are provided, then a plurality of reflectors 100 may be provided to correspond to the number of the speaker modules 50. In the current example embodiment, since two speaker modules 52 and 56 (i.e., a first speaker module 52 and a second speaker module 56) are provided, two reflectors 100 may also be provided.

The two reflectors 100 may include a first reflector 110 and a second reflector 120.

The first reflector 110 is disposed on one side of the front lower side of the display module 10. More specifically, the first reflector 110 may be disposed on one side of the bottom part 42 of the border cover 40 that faces the lower side (the −Z direction) of the first speaker module 52. The first reflector 110 may be integrated with the bottom part 42 of the border cover 40 or may be mounted on the bottom part 42 of the border cover 40 as a separate member. In the current example embodiment, the first reflector 110 integrated with the bottom part 42 (of the border cover 40) may be described as an example.

The first reflector 110 may include an acoustic reflection surface 112 and a rigid rib 116.

The acoustic reflection surface 112 may be a top surface of the first reflector 110 facing the first speaker module 52. The acoustic reflection surface 112 may reflect the sounds emitted from the first speaker module 52 to the front side (the +X axis direction) of the display module 10.

The acoustic reflection surface 112 may be exposed to the front side (the +X axis direction) of the display module 10. The acoustic reflection surface 112 may also be inclined downward (the −Z axis direction) toward the front side (the +X axis direction) of the display module 10 to reflect the sounds, which are emitted from the first speaker module 52 to the lower side (the −Z axis direction), and to the front side (the +X axis direction). The acoustic reflection surface 112 may be designed to have an inclination angle θ at which the sounds emitted from the first speaker module 52 are optimally reflected toward the front side (the +X axis direction) of the display module 10. In the current example embodiment, the inclination angle θ may be about 12°. However, embodiments are not limited thereto. For example, the acoustic reflection surface 112 may be designed to have other inclination angles θ at which the sounds are optimally reflected toward the front side (the +X axis direction) of the display module 10.

Figure 4:
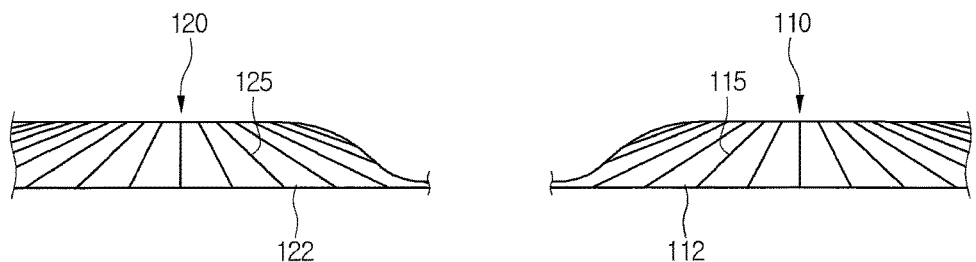
FIGS. 4 to 7 are views for explaining various diffusion patterns of a reflector of the display apparatus of FIG. 2.

For more efficiently reflecting the sounds toward the front side (the +X axis direction) of the display module 10, as shown in FIG. 4, a diffusion pattern 115 for diffusing the sounds toward the front side (the +X axis direction) of the display module 10 may be disposed on the acoustic reflection surface 112. The diffusion pattern 115 may have a fan shape, for example. The fan shape may have a straight line or a curved line shape that is radially spread.

Figure 5:
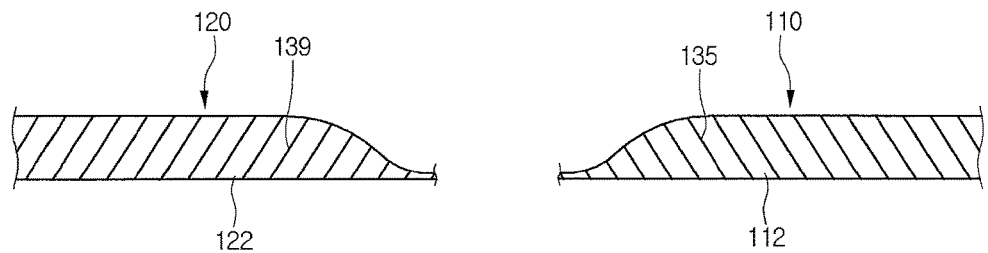

As shown in FIG. 5, a diffusion pattern 135 may have a comb shape, for example. The comb shape may have a straight line or a curved line shape that is radially spread. Further, as shown in FIG. 6, a diffusion pattern 145 may have a wave shape. Also, as shown in FIG. 7, a diffusion pattern 155 may have an embossing shape. However, embodiments are not limited thereto. For example, the diffusion pattern may have different shapes by which the sounds are more efficiently reflected toward the front side (the +X axis direction) of the display module 10.

The rigid rib 116 may support the first reflector 110. The rigid rib 116 may be disposed on an opposite surface 114 of the acoustic reflection surface 112 (i.e., a bottom surface 114 of the first reflector 110). The rigid rib 116 may protrude in a zigzag shape in which a plurality of diagonal lines are formed on the bottom surface 114 of the first reflector 110 along a longitudinal direction (the Y axis direction) of the first reflector 110. When the sounds are emitted downward (the −Z axis direction) from the first speaker module 52, the first reflector 110 may be oscillated in the vertical direction (the Z axis direction) by the emitted sounds. If the oscillation is strong, the first reflector 110 may be deformed or damaged. Since the rigid rib 116 may support the first reflector 110 on the bottom surface 114 of the first reflector 110, oscillation of the first reflector 110 occurring when the sounds are emitted may be minimized to prevent the first reflector 110 from being deformed or damaged.

The second reflector 120 may be disposed on the other side of the front lower side of the display module 10. More particularly, the second reflector 120 may be disposed on the other side of the bottom part 42 (of the border cover 40) that faces the lower side (the −Z direction) of the second speaker module 56. The second reflector 120 may be integrated with the bottom part 42 (of the border cover 40) or may be mounted on the bottom part 42 (of the border cover 40) as a separate member. Similar to the first reflector 110 as described above, in the current example embodiment, the first reflector 110 integrated with the bottom part 42 (of the border cover 40) may be described as an example.

The second reflector 120 may include an acoustic reflection surface 122 and a rigid rib 126, similar to the first reflector 110.

The acoustic reflection surface 122 (of the second reflector 120) may be a top surface of the second reflector 120 facing the second speaker module 56. The acoustic reflection surface 122 may reflect the sounds emitted from the second speaker module 120 to the front side (the +X axis direction) of the display module 10.

The acoustic reflection surface 122 (of the second reflector 120) may be exposed to the front side (the +X axis direction) of the display module 10 at a position that is spaced a predetermined distance from the acoustic reflection surface 112 (of the first reflector 110) in the horizontal direction (the Y axis direction). The acoustic reflection surface 122 (of the second reflector 120) may be inclined downward toward the front side (the +X axis direction) of the display module 10 to reflect the sounds, which are emitted from the second speaker module 56 to the lower side (the −Z axis direction), and to the front side (the +X axis direction), similar to the acoustic reflection surface 112 (of the first reflector 110). The acoustic reflection surface 122 (of the second reflector 120) may also be designed to have an optimum inclination angle, similar to the acoustic reflection surface 112 (of the first reflector 110). In the current example embodiment, the acoustic reflection surface 122 may have an inclination angle of approximately 12°, similar to the acoustic reflection surface 112 (of the first reflector 110).

As shown in FIG. 4, a diffusion pattern 125 may be formed on the acoustic reflection surface 122 (of the second reflector 120), similar to the acoustic reflection surface 112 of the first reflector 110. Further, as shown in FIGS. 5 to 7, the acoustic reflection surface 122 (of the second reflector 120) may also have a comb-shaped diffusion pattern 139, a wave-shaped diffusion pattern 149, or an embossing-shaped diffusion pattern 159, similar to the acoustic reflection surface 112 (of the first reflector 110). Although not limited, similar to the diffusion pattern of the acoustic reflection surface 112 (of the first reflector 110), the diffusion pattern of the acoustic reflection surface 122 (of the second reflector 120) may have different shapes by which the sounds are more efficiently reflected toward the front side (the +X axis direction) of the display module 10.

The rigid rib 126 (of the second reflector 120) may support the second reflector 120. The rigid rib 126 may be disposed on an opposite surface 124 of the acoustic reflection surface 122 of the second reflector 120 (i.e., a bottom surface 124 of the second reflector 120). The rigid rib 126 of the second reflector 120 may protrude in a zigzag shape in which a plurality of diagonal lines are formed on the bottom surface 124 of the second reflector 120 along a longitudinal direction (i.e., the Y axis direction) of the second reflector 120, similar to the rigid rib 116 of the first reflector 110. The rigid rib 126 of the second reflector 120 may minimize oscillation of the second reflector 120 occurring when the sounds are emitted to prevent the first reflector 110 from being deformed or damaged, similar to the rigid rib 116 of the first reflector 110.

Referring to FIG. 10, the display apparatus 1 may further include a rigid reinforcing rib 118. The rigid reinforcing rib 118 may reinforce the rigid rib 126 of the reflector 100. The rigid reinforcing rib 118 may be provided in number corresponding to that of the reflectors 100. Since the two reflectors 100 are provided in the current example embodiment, the two rigid reinforcing ribs 118 may also provided. The rigid reinforcing rib 118 may be disposed on the bottom part 32 of the back cover 30 and may also be disposed in a space between the back cover 30 and the border cover 40. The rigid reinforcing rib 118 may be disposed close to the bottom part of the reflector 100 or may contact the bottom part of the reflector 100.

As described above, the rigid reinforcing rib 118 may reinforce the reflector 100 to minimize oscillation of the reflector 100 occurring when the sounds are emitted from the speaker module 50 or prevent the reflector from being deformed or damaged by the oscillation.

An acoustic emission operation of the display apparatus 1 may be described in more detail.

In the acoustic emission operation of the speaker module 50 and the operation of the reflector 100 for reflecting the sounds emitted from the speaker module 50, since the acoustic emission operation through the second speaker module 56 and the second reflector 120 correspond to that through the first speaker module 52 and the first reflector 110, the acoustic emission operation through the first speaker module 52 and the first reflector 110 may be described as an example.

Referring to FIG. 11, in the display apparatus 1, when sounds are emitted downward (the −Z axis direction) from the first speaker module 52, the first reflector 110 disposed on the lower side (the −Z axis direction) of the first speaker module 52 may reflect the sounds emitted through the acoustic reflection surface 112 to the front side (the +X axis direction) of the display module 10. As described above, the second speaker module 56 and the second reflector 120 may operate through the same manner as the first speaker module 52 and the first reflector 110.

Thus, the display apparatus 1 may emit the sounds to the front side (the +X axis direction) of the display apparatus 1.

Thus, in the current example embodiment, since only a portion on which the reflector 100 is disposed on the front side (the +X axis direction) of the display module 10 is exposed to outside of the display apparatus 1 through the reflector 100 disposed at a position corresponding to the speaker module 50, an opening that is exposed to the front side (the +X axis direction) of the display apparatus 1 may be minimized in size.

As a result, the display apparatus 1 may solve the limitation in beauty that may occur by the structure completely opened to the front lower side of the display module 10 to improve beauty of the display apparatus 1.

Further, the display apparatus 1 may be relatively reduced in thickness t in a lateral direction (the X axis direction) of the housing 20 due to the speaker module 50 disposed in parallel to the vertical direction (the Z axis direction) of the housing 20 when compared to a case in which the speaker module is inclinedly mounted within the housing 20. Thus, a side bezel of the display apparatus 1 may be thinner.

Thus, the display apparatus 1 may realize the slimmer display apparatus 1 according to a trend of slimness in recent years.

Figure 12:
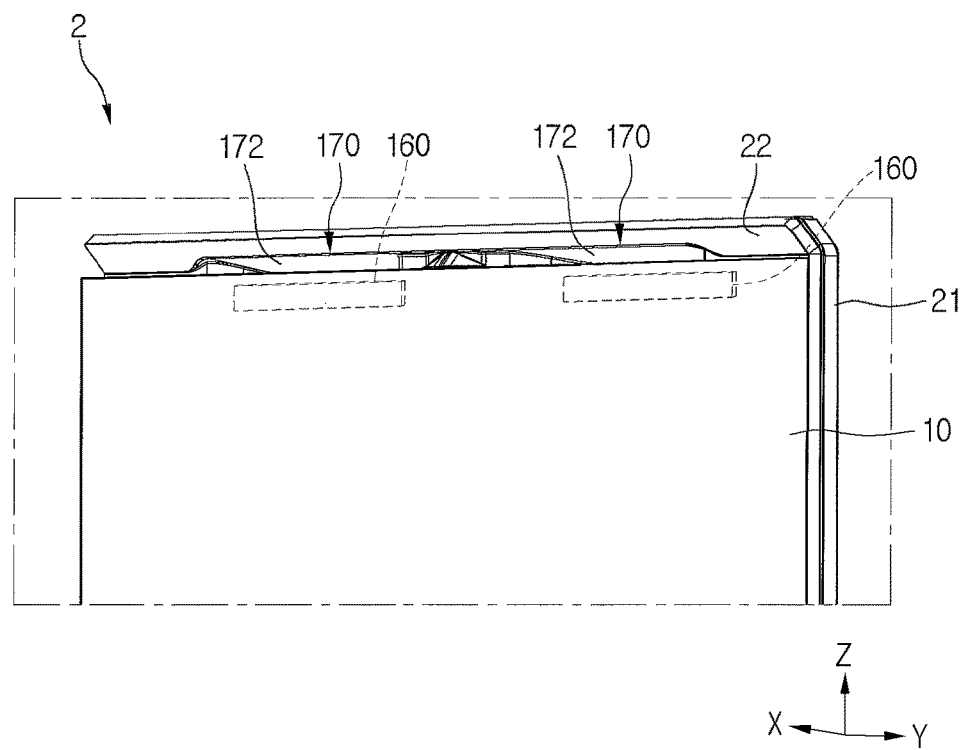
FIGS. 12 and 13 are views for explaining a display apparatus according to an example embodiment.
Figure 13:
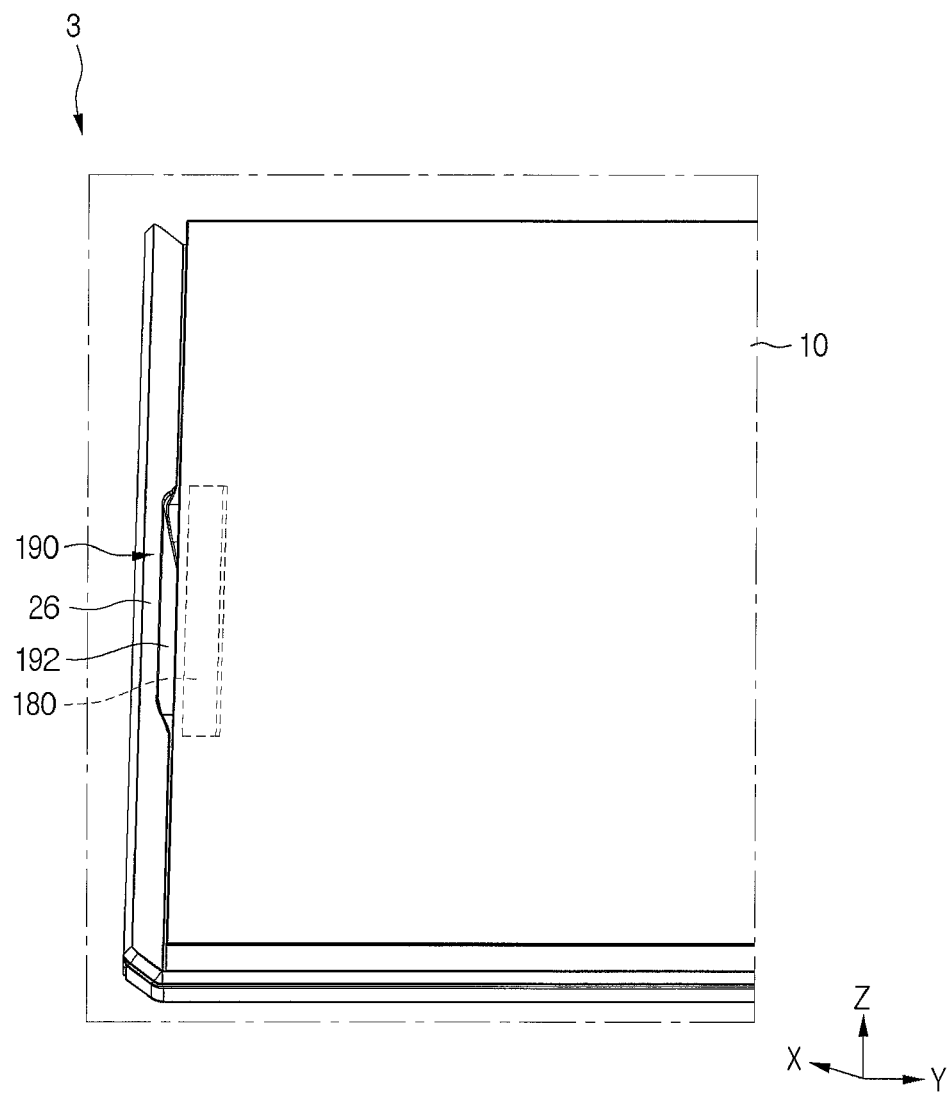

FIGS. 12 and 13 are views for explaining a display apparatus according to example embodiment. Other embodiments and configurations may also be provided.

Since display apparatuses 2 and 3 are substantially equal or similar to the display apparatus 1, a duplicated description with respect to the same constitution may be omitted, and thus different points therebetween may be mainly described.

Referring to FIG. 12, the display apparatus 2 may include a display module 10, a housing 21, a speaker module 160, and a reflector 170.

Since the display module 10 is the same as described above, a detailed description may be omitted.

The housing 21 may accommodate the display module 10 and the speaker module 170. The housing 21 may include a back cover and a border cover, or the housing 21 may be provided as a single member, similar to the foregoing embodiment.

The speaker module 160 may be mounted in parallel to a vertical direction (a Z axis direction) of the housing 21 to emit sounds to an upper side (a +Z axis direction) of the display apparatus 2. The speaker module 160 may be disposed on a rear upper side of the display module 10. The speaker module 160 may be provided as one or as a plurality. In the current example embodiment, two speaker modules 160 may be described. The speaker modules 160 are disposed to be spaced a predetermined distance from each other in a horizontal direction (a Y axis direction).

The reflector 170 may be provided in numbers corresponding to that of the speaker modules 160 and may be disposed adjacent to the speaker modules 160. Thus, in the current example embodiment, two reflectors 170 may be provided.

Each of the reflectors 170 may be disposed on a top surface 22 of the housing 21, and the reflectors 170 may be spaced a predetermined distance from each other in the horizontal direction (the Y axis direction). An acoustic reflection surface 172 that is inclined to be exposed to the front side (a +X axis direction) of the display module 10 on the top surface 22 (of the housing 21) may be disposed on each of the reflectors 170.

As described above, the display apparatus 2 may include the speaker module 160 and the reflector 170 on a front upper side of the display module 10 so that the sounds are emitted to the front side (the +X axis direction) of the display module 10.

Referring to FIG. 13, the display apparatus 3 may include a display module 10, a housing 25, a speaker module 180, and a reflector 190.

Since the display module 10 is the same as described above, a detailed description may be omitted.

The housing 25 may accommodate the display module 10 and the speaker module 180. The housing 25 may include a back cover and a border cover or may be provided as a single member, similar to the foregoing embodiment.

The speaker module 180 may be mounted in parallel to a horizontal direction (a Y axis direction) of the housing 25 to emit sounds to a lateral side (a +Y axis direction) of the display apparatus 3. The speaker module 180 may be disposed on each of both rear sides of the display module 10. The speaker module 180 may be provided as one or as a plurality. In the current example embodiment, two speaker modules 180 may be described. The two speaker modules 180 may be disposed on both rear sides of the display module 10, respectively.

The reflector 190 may be provided in numbers corresponding to that of the speaker modules 180 and may be disposed adjacent to the speaker modules 180. Thus, in the current example embodiment, the two reflectors 190 may be provided and may be respectively disposed on both side surfaces 26 of the housing 25.

An acoustic reflection surface 192 that is inclined to be exposed to the front side (a +X axis direction) of the display module 10 on each of both side surfaces 26 of the housing 25 may be disposed on each of the reflectors 190.

As described above, the display apparatus 3 may include the speaker module 180 and the reflector 190 on both front sides of the display module 10 so that the sounds are emitted to the front side (the +X axis direction) of the display module 10.

Figure 14:
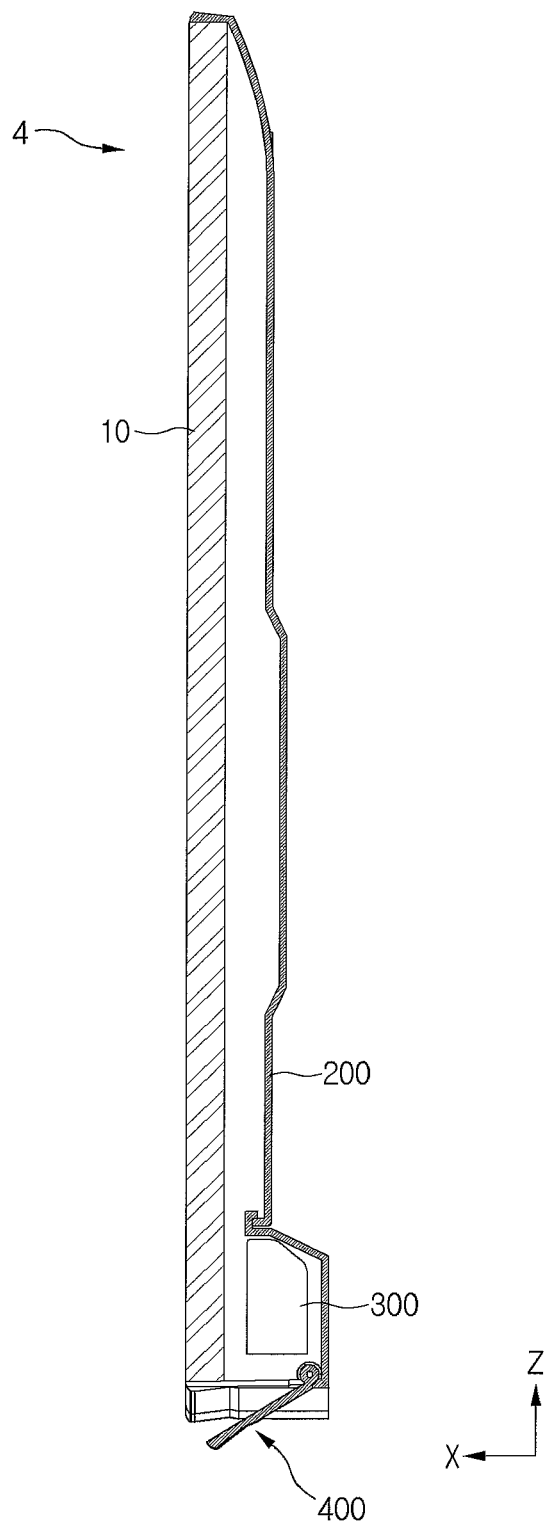
FIG. 14 is a side cross-sectional view of a display apparatus according to an example embodiment.
Figure 15:
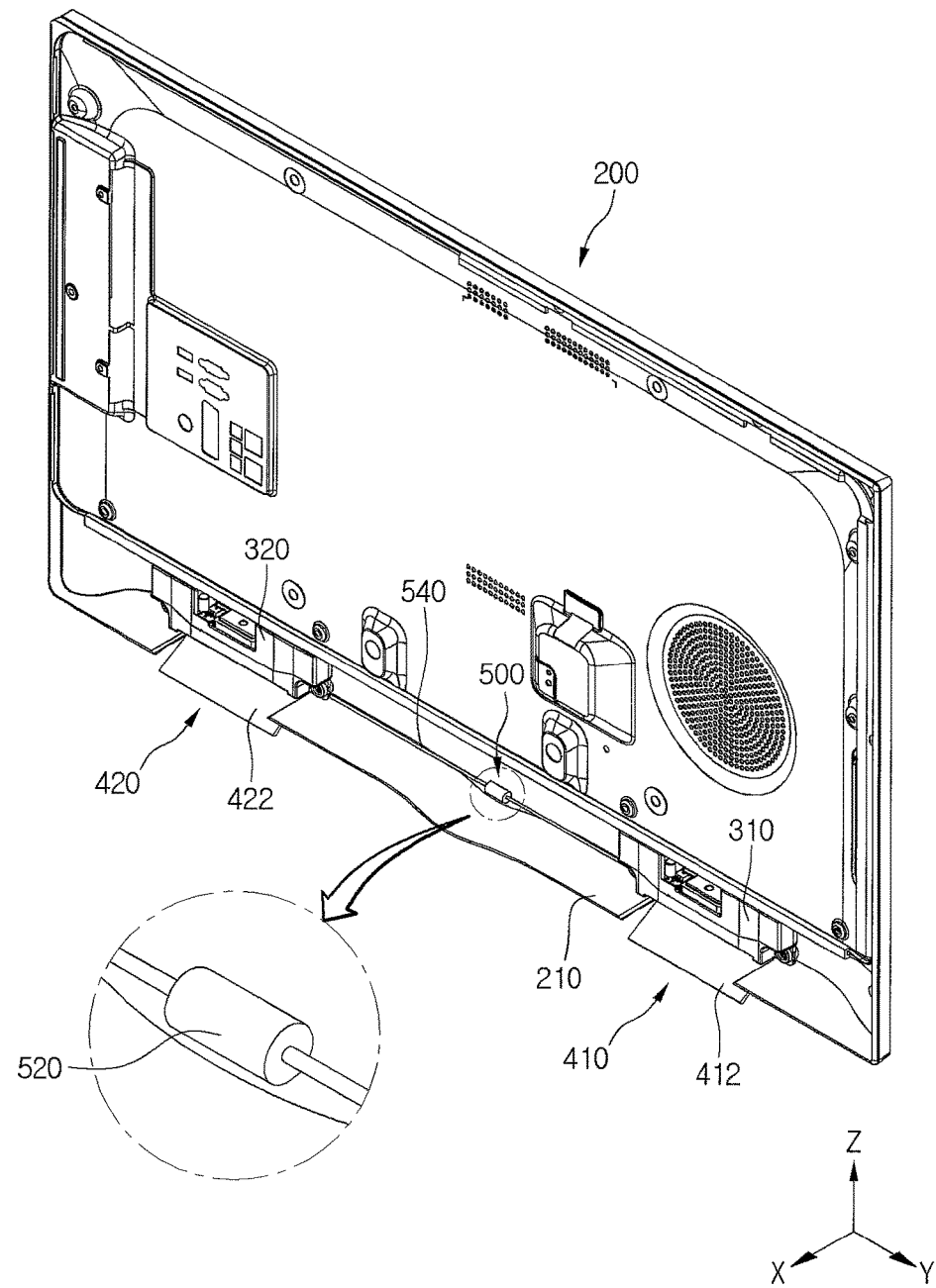
FIG. 15 is a perspective view of the display apparatus of FIG. 14 except for a display module.
Figure 16:
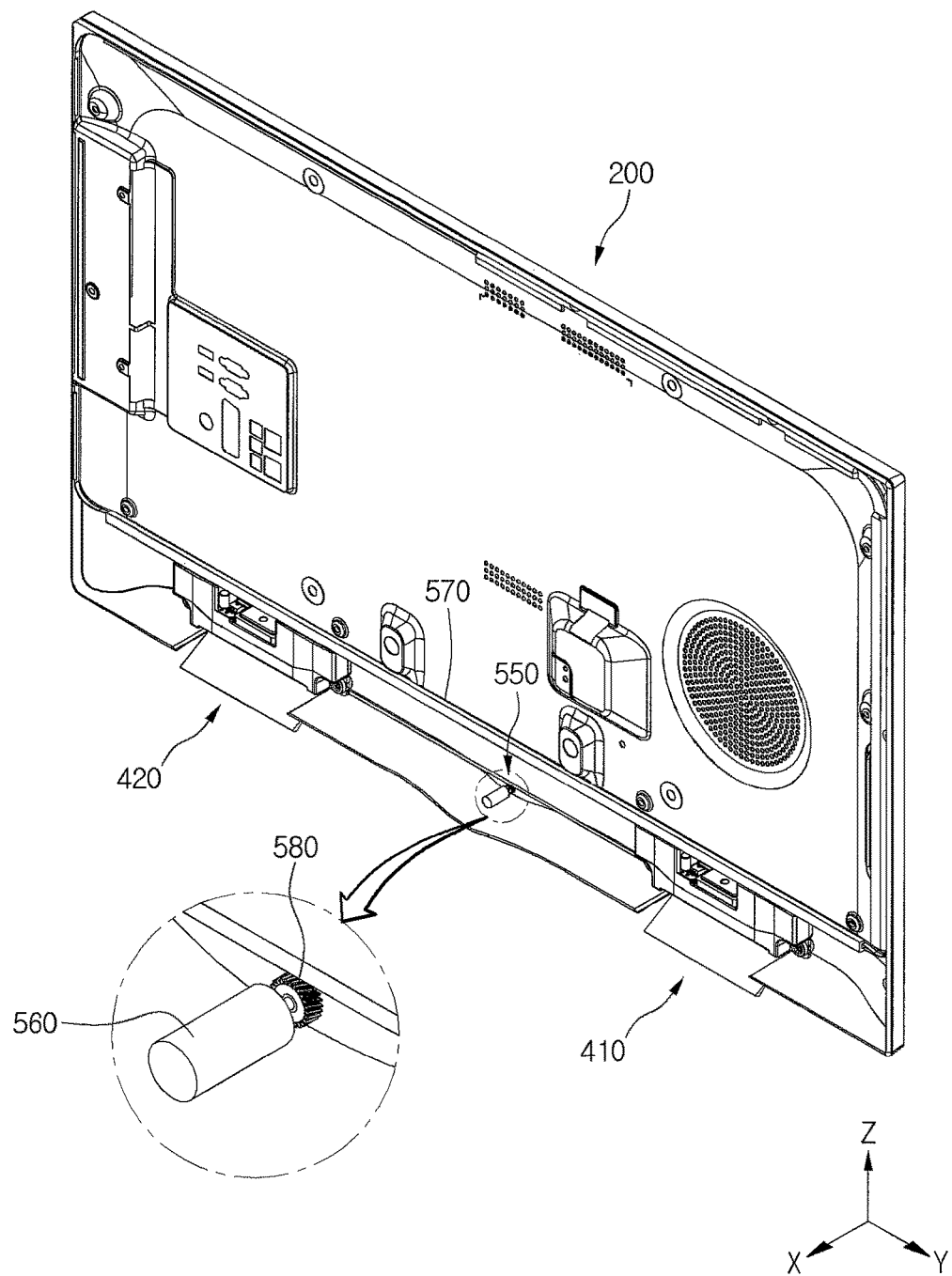
FIG. 16 is a view for explaining a reflector driving unit of the display apparatus of FIG. 14 according to an example embodiment.

FIG. 14 is a side cross-sectional view of a display apparatus according to an example embodiment. FIG. 15 is a perspective view of the display apparatus of FIG. 14 except for a display module. FIG. 16 is a view for explaining a reflector driving unit of the display apparatus of FIG. 14 according to an example embodiment. Other embodiments and configurations may also be provided.

Since a display apparatus 4 is substantially similar to the display apparatus 1, a duplicated description with respect to the same constitution may be omitted, and thus different points therebetween may be mainly described.

Referring to FIGS. 14 to 15, a display apparatus 4 may include a display module 10, a housing 200, a speaker module 300, a reflector 400, and a reflector driving unit 500.

Since the display module 10 is the same as described above, a detailed description may be omitted.

The housing 200 may accommodate the display module 10, the speaker module 300, the reflector driving unit 500, and various components constituting the display apparatus 4. The housing 200 may include a back cover and a border cover, or may be provided as a single member, similar to the foregoing embodiment.

The speaker module 300 may be disposed on an upper side (a +Z axis direction) of a bottom part 210 of the housing 200 in parallel to the vertical direction (a Z axis direction) of the housing 200. The speaker module 300 may include a first speaker module 310 and a second speaker module 320. The first and second speaker modules 310 and 320 are disposed to be spaced a predetermined distance from each other in a horizontal direction (a Y axis direction).

The reflector 400 may be disposed on the bottom part 210 of the housing 200 and may also be disposed close to the speaker module 300 in a lower side (a −Z axis direction) of the speaker module 300. The reflector 400 may be movably disposed between a position at which acoustic reflection surfaces 412 and 422, which may be described below, is exposed to outside of the housing 200 and a position at which the acoustic reflection surfaces 412 and 422 are accommodated into the housing 200 by the reflector driving unit 500. The acoustic reflection surfaces 412 and 422 of the reflector 400 may be disposed on the position at which the acoustic reflection surfaces 412 and 422 are exposed to outside of the housing 200 when sounds are emitted. The acoustic reflection surfaces 412 and 422 may be disposed on the position at which the acoustic reflection surfaces 412 and 422 are accommodated into the housing 200 when the sounds are not emitted.

The reflector 400 may include a first reflector 410 and a second reflector 420.

The first reflector 410 may be disposed under the first speaker module 310 and may also be disposed on one side of the bottom part 210 of the housing 200. A top surface 412 of the first reflector 410 facing the first speaker module 310 may function as the acoustic reflection surface 412.

The first reflector 410 may be coupled to the reflector driving unit 500. When the reflector driving unit 500 operates, the first reflector 410 may be slid along a curved trace, and more particularly along a circular trace between a position at which the acoustic reflection surface 412 is exposed to the front side (the +X axis direction) of the display module 10 and a position at which the acoustic reflection surface 412 is accommodated into the housing 200.

Similar to the foregoing embodiment, a rigid rib may be disposed on a bottom surface (the bottom surface 414 of FIG. 16) of the first reflector 410. Additionally, similar to the foregoing example embodiment, a diffusion pattern for diffusing sounds may also be disposed on the acoustic reflection surface 412 of the first reflector 410.

The second reflector 420 may be spaced a predetermined distance from the first reflector 410 in the horizontal direction (the Y axis direction). The second reflector 420 may be disposed under the second speaker module 320 and may also be disposed on the other side of the bottom part 210 of the housing 200. A top surface 422 of the second reflector 420 facing the second speaker module 320 may function as the acoustic reflection surface 422.

The second reflector 420 may be coupled to the reflector driving unit 500, similar to the first reflector 410. Additionally, similar to the first reflector 410, the second reflector 420 may be slid along a curved trace, and more particularly along a circular trace between a position at which the acoustic reflection surface 422 is exposed to the front side (the +X axis direction) of the display module 10 and a position at which the acoustic reflection surface 422 is accommodated into the housing 200. The position at which the acoustic reflection surfaces 412 and 422 are exposed to the front side (the +X axis direction) of the display module 10 may be defined as a first position, and the position at which the acoustic reflection surfaces 412 and 422 are accommodated into the housing 200 may be defined as a second position.

Similar to the foregoing example embodiment, a rigid rib may be disposed on a bottom surface of the second reflector 420. Additionally, similar to the foregoing example embodiment, a diffusion pattern for diffusing sounds may also be disposed on the acoustic reflection surface 422 of the second reflector 420.

The reflector driving unit 500 may be coupled to each of the first and second reflectors 410 and 420 to provide a driving force for moving each of the first and second reflectors 410 and 420. The reflector driving unit 500 may include a driving motor 520 and a driving shaft 540.

The driving motor 520 may provide a driving force and may be mounted within the housing 200 in the horizontal direction (the Y axis direction). The driving motor 520 may be provided as a double shaft motor. The driving motor 520 may be a small size motor (and/or other motors) for sliding the first and second reflectors 410 and 420.

The driving shaft 540 may be disposed in the horizontal direction (the Y axis direction) of the housing 200 to connect the driving motor 520 to each of the first and second reflectors 410 and 420. The first and second reflectors 410 and 420 connected to the driving shaft 540 may vertically (the Y axis direction) rotate by using the driving shaft 540 as an axial direction (the Y axis direction) as the driving motor 520 operates.

However, the reflector driving unit 500 may not be limited to the above-described structure. For example, as shown in FIG. 16, the reflector driving unit 550 may include a driving motor 560, a driving shaft 570, and a driving gear 580.

The driving motor 560 may be mounted in a width direction (the X axis direction) of the housing 200. The driving motor 560 may be provided as a single shaft motor.

The driving shaft 570 may be mounted in the horizontal direction (the Y axis direction) of the housing 200, and may be connected to the first and second reflectors 410 and 420.

The driving gear 580 may connect the driving motor 560 to the driving shaft 570. The driving gear 580 may rotate the driving shaft 570 as the driving motor 560 operates. The driving gear 580 may be a worm gear. However, embodiments are not limited thereto. For example, the driving gear 580 may be other gears for rotating the driving shaft 570 as the driving motor 560 operates.

Thus, the first and second reflectors 410, 420 connected to the driving shaft 540 may vertically (the Z axis direction) rotate by using the driving shaft 540 as an axial direction (the Y axis direction).

As described above, the reflector driving unit 550 may have a structure that includes the driving gear 580. That is, each of the reflector driving units 500 and 550 may have a double shaft motor or a single shaft motor structure. Further, the reflector driving units 500 and 560 may have other motor or driving structures that are capable of rotating the first and second reflectors 410 and 420 in addition to the above-described structure.

An operation of the reflector 400 of the display apparatus 4 may be described in more detail.

Figure 17:
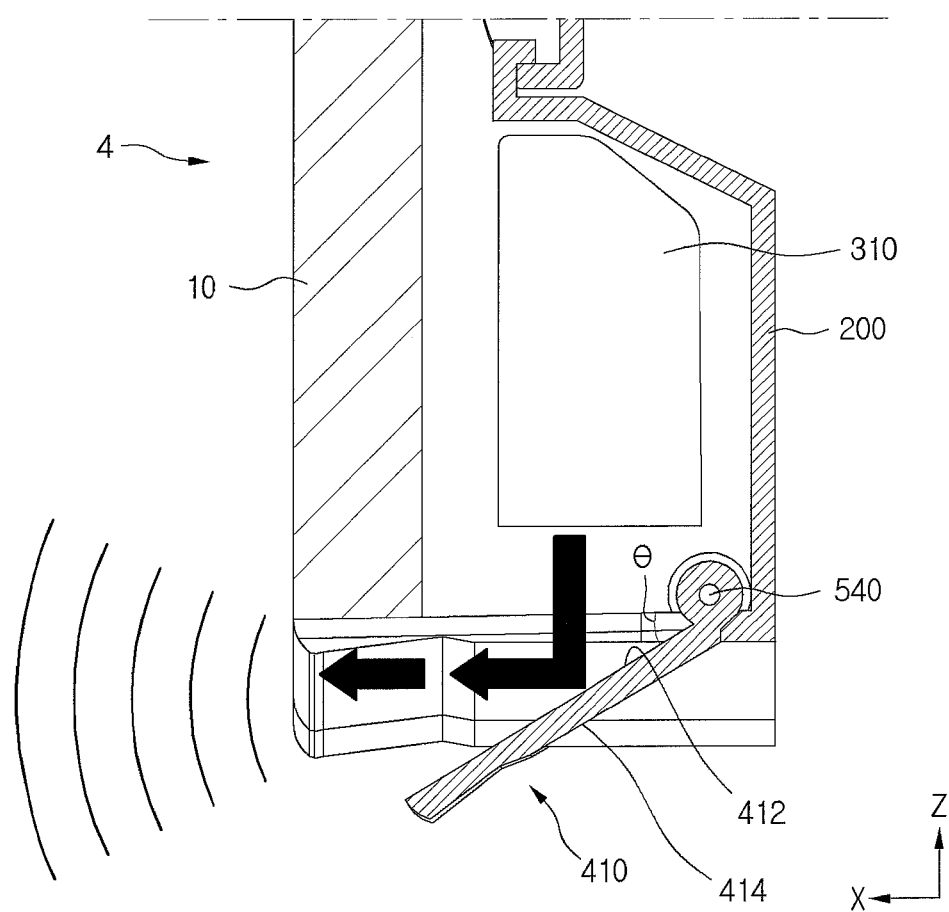
FIGS. 17 and 18 are views for explaining an operation of a reflector of the display apparatus of FIG. 14.
Figure 18:
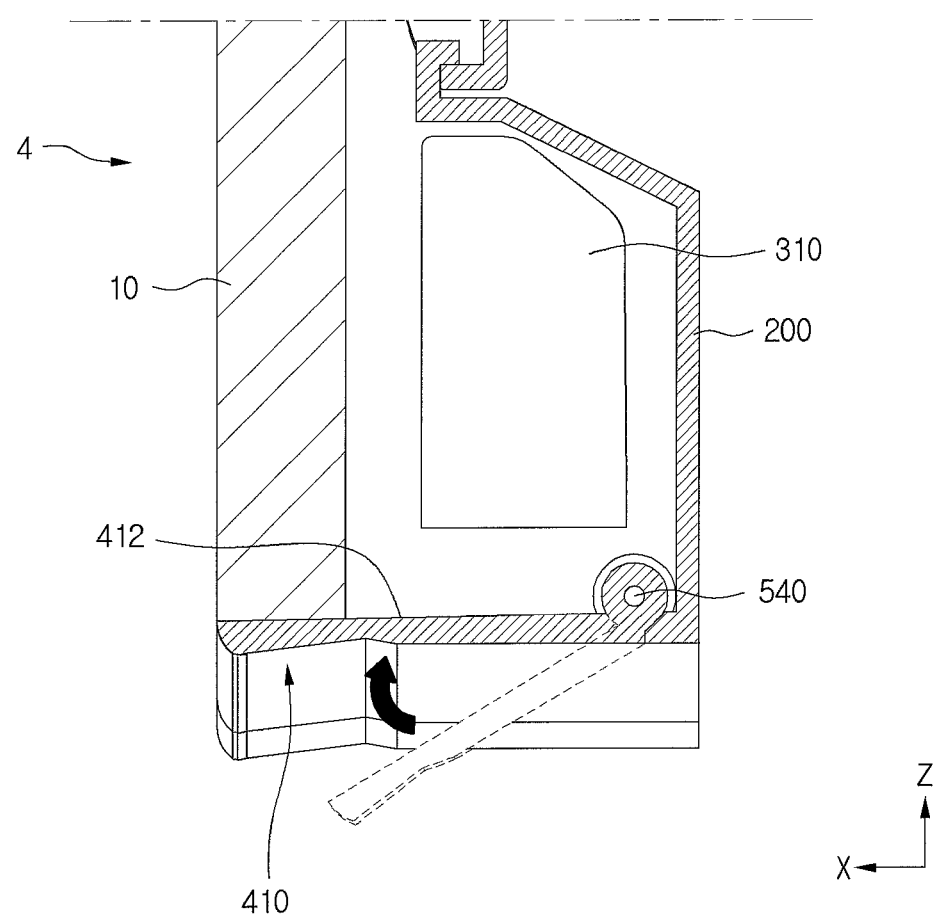

FIGS. 17 and 18 are views for explaining an operation of the reflector of the display apparatus of FIG. 14. Other embodiments and configurations may also be provided.

Similar to the foregoing embodiment, in the acoustic emission operation of the speaker module 300 and the operation of the reflector 400 for reflecting the sounds emitted from the speaker module 300, since the acoustic emission operation through the second speaker module 320 and the second reflector 420 correspond to that through the first speaker module 310 and the first reflector 410, the acoustic emission operation through the first speaker module 310 and the first reflector 410 may be described as an example.

Referring to FIG. 17, in the display apparatus 4, when sounds are emitted, the acoustic reflection surface 412 of the first reflector 410 may be disposed at the first position (i.e., a position at which the acoustic reflection surfaces 412 and 422 of the reflector 400 are exposed to the front side (the +X axis direction) of the display module 10). Thus, the first reflector 410 may be inclinedly disposed with respect to the bottom part 210 of the housing 200.

The first reflector 410 may have an inclination angle θ at which the sounds emitted from the first speaker module 310 are optimally reflected toward the front side (the +X axis direction) of the display module 10, similar to the forgoing embodiment. For example, the first reflector 410 may have an inclination angle of approximately 12°, similar to the forgoing example embodiment. However, embodiments are not limited thereto. For example, like the forgoing example embodiment, the acoustic reflection surface may have other inclination angles θ at which the sounds are optimally reflected toward the front side (the +X axis direction) of the display module 10.

Thus, in the display apparatus 4, when the sounds are emitted downward (the −Z axis direction) from the first speaker module 310, the first reflector 410 disposed on the lower side (the −Z axis direction) of the first speaker module 310 may reflect the sounds emitted through the acoustic reflection surface 412 to the front side (the +X axis direction) of the display module 10.

Similarly, the second speaker module 320 and the second reflector 420 may also operate in a same manner as the first speaker module 310 and the first reflector 410.

Thus, the display apparatus 4 may emit the sounds to the front side (the +X axis direction) of the display apparatus 4.

Referring to FIG. 18, when the display apparatus 4 emits the sounds, the acoustic reflection surface 412 of the first reflector 410 may be disposed at the second position (i.e., position at which the acoustic reflection surfaces 412 and 422 of the reflector 400 are accommodated into the housing 200). The example in which the sounds are not emitted from the display apparatus 4 may correspond to an example in which the display apparatus 4 is turned off, or the sounds generated in the display apparatus 4 are muted, for example.

The disposition according to the second position may be realized by the sliding along the curved trace of the first reflector 410 due to operation of the reflector driving unit 500, similar to the foregoing example embodiment. The first reflector 410 may rotate upward (the +Z axis direction) by using a driving shaft 540 as a rotation axis due to operation of the reflector driving unit 500 to locate the acoustic surface 412 at the second position.

On the other hand, when the sounds are emitted again from the display apparatus 4, the first reflector 410 may rotate downward (the +Z axis direction) by using the driving shaft 540 as a rotation axis due to operation of the reflector driving unit 500 to locate the acoustic surface 412 at the first position. Accordingly, the acoustic surface 412 of the first reflector 410 may be disposed again at the first position.

Similarly, when the sounds are emitted or not emitted from the display apparatus 4, the second reflector 420 may also rotate vertically (the Z axis direction) by using the driving shaft 540 as a rotation axis, similar to the first reflector 410.

As described above, in the display apparatus 4, only when the sounds are emitted to outside of the display apparatus 4, the acoustic surfaces 412 and 422 of the reflector 400 may be exposed to the outside. On the other hand, when the sounds are not emitted, the acoustic surfaces 412 and 422 of the reflector 400 may not be exposed to the outside. This may prevent the display apparatus 4 from being deteriorated in beauty due to the exposed acoustic surfaces 412 and 422.

Thus, the display apparatus 4 may be improved in beauty.

Furthermore, the display apparatus 4 may also be relatively reduced in thickness of a side bezel through the speaker module 300 mounted in parallel to the vertical direction (the +Z axis direction) of the housing 200, similar to the foregoing example embodiment.

Thus, the display apparatus 4 may realize the slimmer display apparatus 4 according to a recent trend of the slimness.

Hereinafter, an operation of the display apparatus 4 may be described in more detail.

Figure 19:
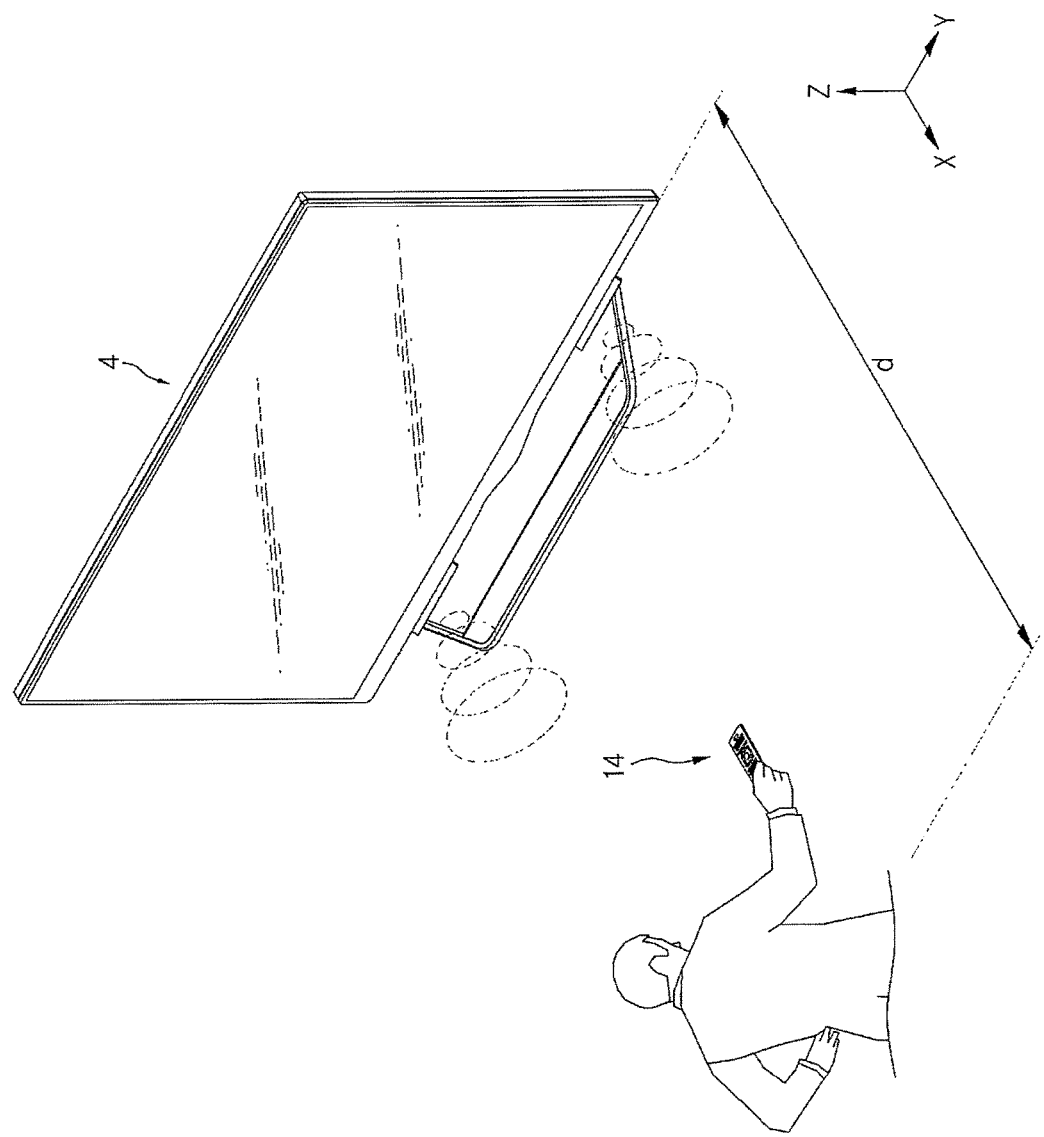
FIG. 19 is a view for explaining an operation of the display apparatus of FIG. 14.
Figure 20:
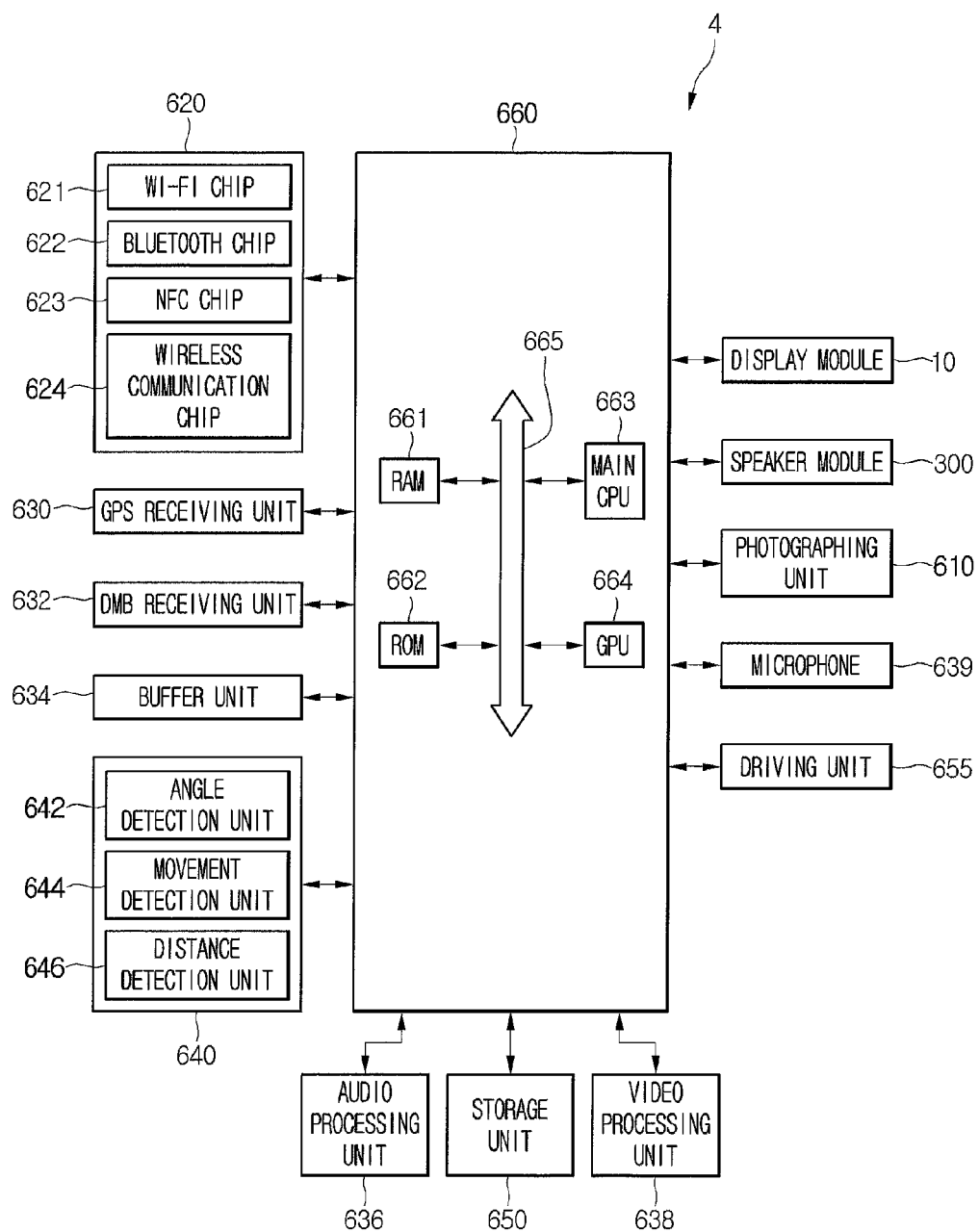
FIG. 20 is a block diagram illustrating constitutions of the display apparatus of FIG. 14.

FIG. 19 is a view for explaining an operation of the display apparatus of FIG. 14. FIG. 20 is a block diagram illustrating constitutions of the display apparatus of FIG. 14. Other embodiments and configurations may also be provided.

Referring to FIG. 19, the display apparatus 4 may operate by a user's manipulation through a remote control device 14 (such as a remote controller) or through on screen display.

Referring to FIG. 20, the display apparatus 4 may further include a display module 10, a speaker module 300, a photographing unit 610, a communication unit 620, a GPS receiving unit 630, a DMB receiving unit 632, a buffer unit 634, an audio processing unit 636, a video processing unit 638, a microphone 639, a detection unit 640, a storage unit 650, a driving unit 655, and a control unit 660.

Since the display module 10 and the speaker module 300 have been described above, a duplicated description may be omitted.

The photographing unit 610 may photograph an image for determining whether a user exists and a position of the user. The photographing unit 610 may include a camera module for photographing external environments of the display apparatus 4. The photographed image may be analyzed by the control unit 660. The control unit 660 may determine whether the user exists and the position of the user based on the analyzed image.

The communication unit 620 may be a component for communicating with the remote control device 14 or various types of external devices through various types of communication manners. The communication unit 620 may include a Wi-Fi chip 621, a Bluetooth chip 622, a near field communication (NFC) chip 623, and a wireless communication chip 624. The Wi-Fi chip 621, the Bluetooth chip 622, and the NFC chip 623 may communicate in Wi-Fi communication, Bluetooth communication, and NFC communication manners, respectively. The wireless communication chip 624 may represent a chip for communicating according to various communication standards such as IEEE, Zigbee, 3rd generation (3G), 3rd generation partnership project (3GPP), and long term evolution (LTE). The communication unit 620 may include at least one chip among the above-described various chips or a chip according to the communication standard. Thus, the communication unit 620 may communicate with an external server or other devices by using the chip. The control unit 660 may be accessed to a Web server through the communication unit 620 to display a Web screen.

The GPS receiving unit 630 may be a component for receiving a GPS signal from a GPS satellite to calculate a current position of the display apparatus 4. When a navigation program is executed, the control unit 660 may perform a navigation operation based on the position detected by the GPS receiving unit 630.

The DMB receiving unit 632 may receive and process a digital multimedia broadcasting (DMB) signal.

The buffer unit 634 may be a component for storing screen data to be displayed on the display module 10.

The audio processing unit 636 may be a component for processing audio data included in contents. The audio processing unit 636 may perform various processing functions such as decoding, amplification, and noise filtering with respect to the audio data. The audio data generated through the audio processing unit 636 may be outputted to outside of the display apparatus 4 through the speaker module 300.

The video processing unit 638 may be a component for processing video data included in contents. The video processing unit 638 may perform various image processing functions such as decoding, scaling, and noise filtering, frame rate conversion, and/or resolution conversion. The video data generated through the video processing unit 638 may be outputted to outside of the display apparatus 4 through the display module 10.

The microphone 639 may be a component for receiving a user's voice or other sounds to convert the user's voice or other sounds into audio data. The conversion may be performed through the control unit 639. Further, the control unit 660 may store the converted audio data into the storage unit 650.

The detection unit 640 may be a component for detecting an rotation angle of a reflector (such as the reflector 400 of FIG. 14), movement in a vicinity of the display apparatus 4, a distance between the display apparatus 4 and the remote control device 14, and a distance between the display apparatus 4 and a user. The detection unit 640 may include an angle detection unit 642 (or angle detection part), a movement detection unit 644 (or movement detection part), and a distance detection unit 646 (or distance detection part).

The angle detection unit 642 may detect a rotation angle of the reflector 400 (i.e., an inclination angle of the reflector 400). For this, the angle detection unit 642 may be disposed on a hinge connection part between the reflector 400 and a reflector driving unit (such as the reflector driving unit 500 of FIG. 15). The angle detection unit 642 may be provided as a general angle sensor for detecting a rotation angle.

The movement detection unit 644 may detect movement in the periphery of the display apparatus 4, and more particularly may detect movement at a front side of the display apparatus 4. For this, the movement detection unit 644 may be disposed at the front side of the display apparatus 4. The movement detection unit 644 may also be provided as a general movement detection sensor for detecting movement of a subject. For example, the movement detection sensor may include an infrared sensor or an ultrasonic sensor.

The distance detection unit 646 may detect a distance between the display apparatus 4 and the remote control device 15 or a distance d between the display apparatus 4 and the user. The distance detection unit 646 may be provided as a general distance detection sensor for detecting a distance.

The storage unit 650 may be a component for storing various control information such as preset control information, an operating system (O/S) for operating the display apparatus 4, firmware, and/or an application. The preset control information may include preset rotation angle information of the reflector 400, preset movement information, acoustic emission information according to a preset rotation angle of the reflector 400, and/or preset user mode information. The preset user mode information may include reflector driving mode information by which the reflector 400 moves at a first position (a position at which acoustic reflection surfaces (such as the acoustic reflection surfaces 412 and 422 of FIG. 15) of the reflector 400 are exposed to a front side (a +X axis direction) of the display module 10) or a second position (a position at which the acoustic reflection surfaces (the acoustic reflection surfaces 412 and 422) are accommodated into a housing (the housing 200 of FIG. 14), far distance mode information by which sounds are reflected from the display apparatus 4 up to a far distance, near distance mode information by which sounds are reflected from the display apparatus 4 up to a near distance, maximum acoustic emission mode information by which sounds are reflected to output maximum acoustic intensity, minimum acoustic emission mode information by which sounds are reflected to output minimum acoustic intensity, and acoustic reflection mode information according to a user's position, by which a rotation angle of a reflector is adjusted according to the user's position. Further, the storage unit 650 may include a nonvolatile memory such as a flash memory.

The driving unit 655 may be a component for controlling an operation of the reflector driving unit 500 to realize a rotation operation of the reflector 400. The driving unit 655 may be electrically connected to the reflector driving unit 500 to control an operation of the reflector driving unit 500 based on a control command transmitted from the control unit 660.

The control unit 660 may control an overall operation of the display apparatus 4 by using program stored in the storage unit 650. The control unit 660 may include a RAM 661, a ROM 662, a main CPU 663, a graphic process unit (GPU) 664, and/or a bus 665. The RAM 661, the ROM 662, the main CPU 663, and the GPU 664 may be connected to each other through the bus 665. Additionally, the control unit 660 may further include various interfaces, although drawing or descriptions will be omitted.

The main CPU 663 may be accessed to the storage unit 650 to boot an O/S stored in the storage unit 650. A command set for booting a system may be stored in the ROM 662. When a turn-on command is inputted to supply a power, the main CPU 663 may copy the O/S stored in the storage unit 650 to the RAM 661 according to a command stored in the ROM 662 to execute the O/S, thereby booting the system. When the system is booted, the main CPU 663 may copy various programs stored in the storage unit 650 to the RAM 661 to execute the copied programs, thereby performing various operations.

The GPU 664 may generate wallpaper, an icon display screen, a lock screen, and/or other transition screen. The GPU 664 may calculate attribute values (such as coordinate values, shapes, sizes, colors, and the like), of objects within each of the screens based on the screen data stored in the storage unit 650. The GPU 664 may generate the above-described various screens based on the calculated attribute values. The generated screen data may be stored in the buffer unit 634. The screen data stored in the buffer unit 634 may be displayed by the display module 10.

Further, the control unit 660 may control a rotation operation of the reflector 400 to allow the reflector 400 to reflect sounds. More particularly, the control unit 660 may control the driving unit 655 to drive the reflector driving unit 500, thereby allowing the reflector to rotate. The control unit 660 may change a rotation angle of the reflector 400 based on the detected result of the detection unit 640 or execute various operation of the reflector 400 based on the control information of the storage unit 650.

Figure 21:
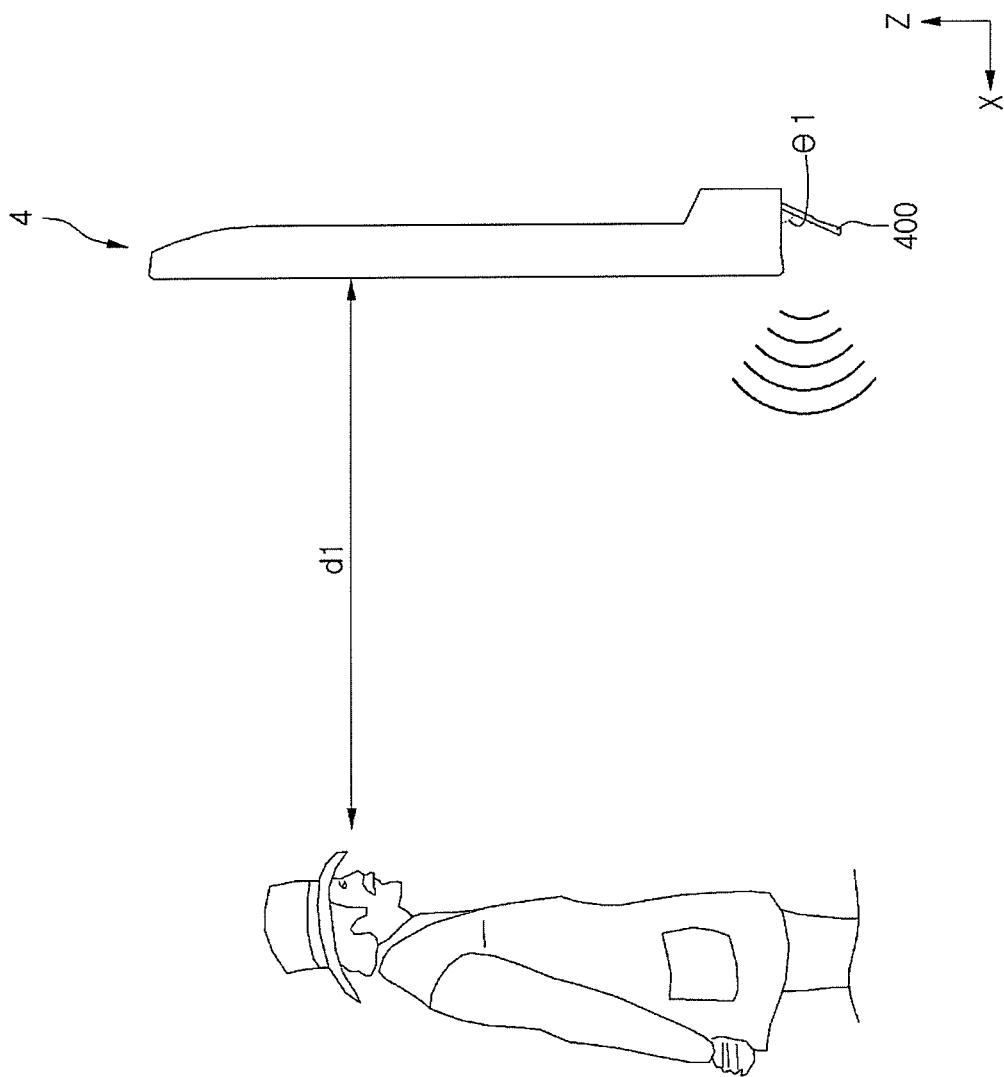
FIGS. 21 and 22 are views for explaining various control operations of the reflector of the display apparatus of FIG. 14.
Figure 22:
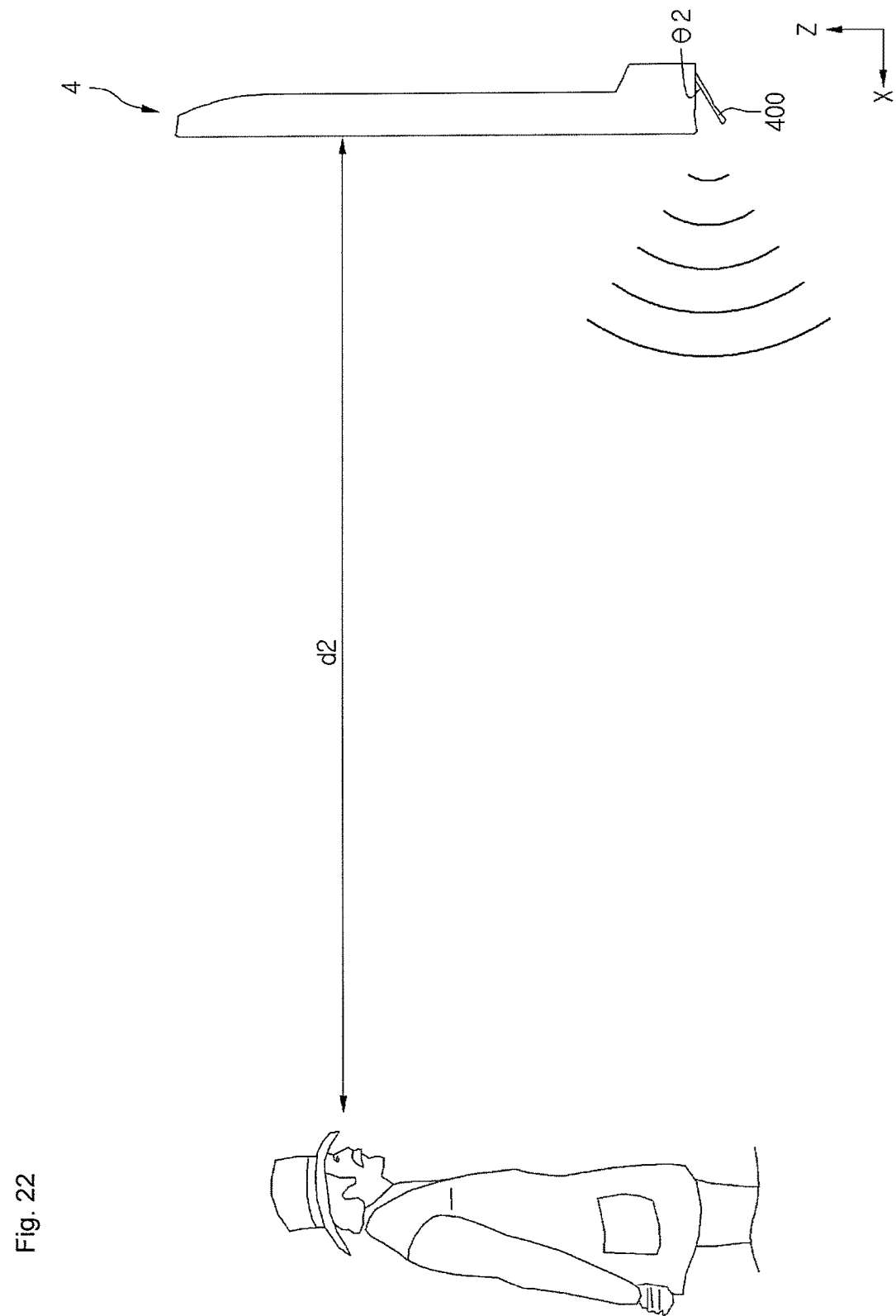

FIGS. 21 and 22 are views for explaining various control operations of the reflector of the display apparatus of FIG. 14. Other embodiments and configurations may also be provided.

Referring to FIGS. 21 and 22, the display apparatus 4 may variously adjust a rotation angle of the reflector for reflecting emitted sounds (i.e., an inclination angle of the reflector 400). Since the rotation angle of the reflector 400 is adjusted, the display apparatus 4 may control an acoustic emission amount.

When a user watches the display apparatus 4, the user may be located at a far distance or a near distance from the display apparatus 4. The display apparatus 4 may adjust the rotation angle of the reflector 400 according to the user's position to optimally provide sounds to the user.

As described above, the rotation angle of the reflector 400 may be adjusted by controlling the rotation angle of the reflector 400 through the control unit (the control unit 660 of FIG. 20). More particularly, the control unit 660 may adjust the rotation angle of the reflector 400 to emit optimum sounds corresponding to a detected position or distance according to a user's image photographed by the photographing unit (the photographing unit 610 of FIG. 20), user voice information transmitted from the microphone (the microphone 639 of FIG. 20), a user's position transmitted from the movement detection unit (the movement detection unit 644 of FIG. 20), or a distance between the user and the display apparatus 4, which is detected by the distance detection unit (the distance detection unit 646 of FIG. 20). The control information corresponding to the rotation angle of the reflector 400, by which sounds are optimally emitted according to the user's position or distance, may be previously stored in the storage unit (the storage unit 650 of FIG. 20). Further, the control unit 660 may determine an angle range to be changed based on the angle of the reflector 400 before changing, which is detected by the angle detection unit 642, when the rotation angle of the reflector 400 is adjusted.

For example, as shown in FIG. 21, if the user is located at a near distance d1 from the display apparatus 4, the control unit 660 may adjust the rotation angle of the reflector 400 to an optimum acoustic reflection angle $\theta 1$ corresponding to the near distance d1. The control information with respect to the optimum acoustic reflection angle $\theta 1$ corresponding to the near distance d1 may be stored in the storage unit 650. Further, the rotation operation of the reflector 400 may be realized through the reflector driving unit (the reflection driving unit 500 of FIG. 15) according to the control of the driving unit 655.

As shown in FIG. 22, if the user is located at a far distance d2 from the display apparatus 4, the control unit 660 may adjust the rotation angle of the reflector 400 to an optimum acoustic reflection angle $\theta 2$ corresponding to the far distance d2. The control information with respect to the optimum acoustic reflection angle $\theta 2$ corresponding to the far distance d2 may also be stored in the storage unit 650. Additionally, the rotation operation of the reflector 400 may be realized through the reflector driving unit (the reflector driving unit 500 of FIG. 15) according to the control of the driving unit 655.

As described above, the display apparatus 4 may adjust the angle of the reflector 400 to detect the user's position or the distance between the user and the display apparatus 4, thereby providing optimum sounds to the user.

Figure 23:
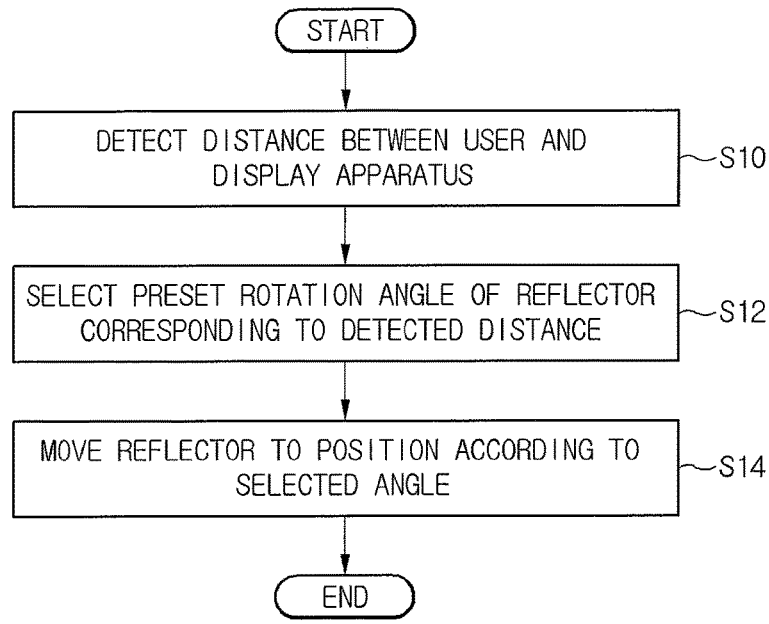
FIGS. 23 to 25 are flowcharts for explaining various control methods of the reflector of the display apparatus of FIG. 14.
Figure 24:
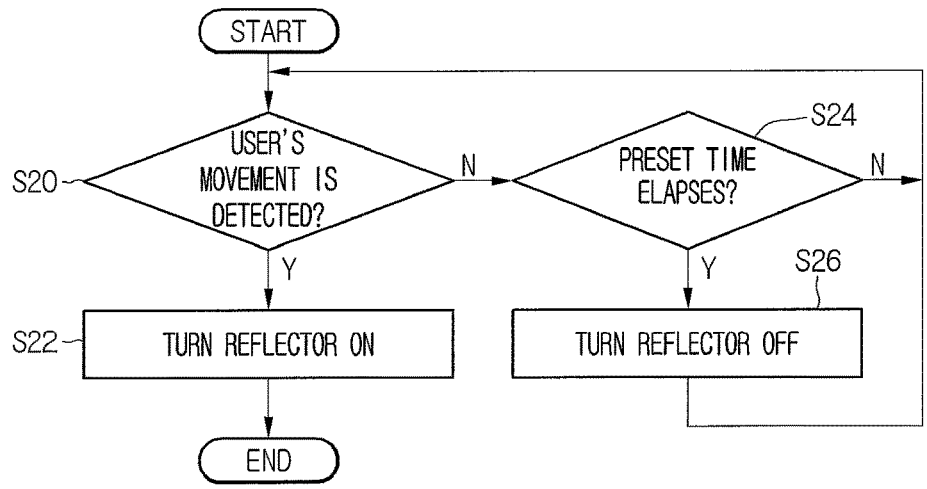
Figure 25:
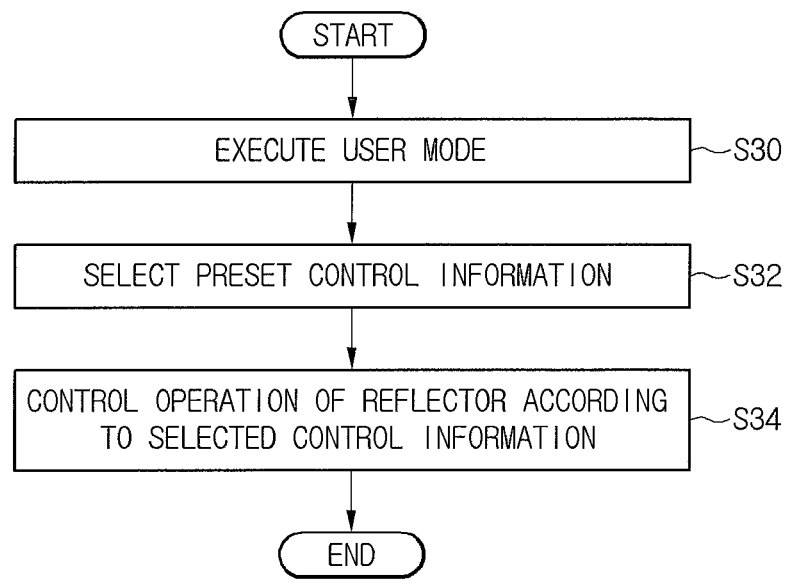

FIGS. 23 to 25 are flowcharts for explaining various control methods of the reflector of the display apparatus of FIG. 14. Other embodiments, operations and orders of operations may also be provided.

Since constitutions and detection method with respect to a control method to be described with reference to FIGS. 23 to 25 are previously described, duplicated descriptions may be omitted.

Referring to FIG. 23, a display apparatus may detect a distance between a user and the display apparatus (S10). When the distance between the user and the display apparatus is detected, the display apparatus may select a preset rotation angle of the reflector that corresponds to the detected distance (S12). The selected angle may be an acoustic reflection angle at which sounds are optimally provided to the user. Thereafter, the display apparatus may move the reflector to a position corresponding to the selected angle (S14).

As described above, the display apparatus may detect the distance between the user and the display apparatus to move the reflector to a position at which the optimum sounds corresponding to the detected distance are provided to the user.

Referring to FIG. 24, the display apparatus may detect whether a user's movement is detected (S20). If the movement is detected, the display apparatus may turn the reflector on (S22). The turn-on of the reflector may represent movement of the reflector to a first position (i.e., a position at which acoustic reflection surfaces (the acoustic reflection surfaces 412 and 422 of FIG. 15) of a reflector (the reflector 400 of FIG. 14) are exposed to a front side (a +X axis direction) of a display module (the display module 10 of FIG. 14). If the movement is not detected, the display apparatus may determine whether a preset time elapses (S24). Thereafter, if the preset time elapses, the display apparatus may turn the reflector on (S26). The turn-off of the reflector may represent movement of the reflector to a second position (i.e., a position at which the acoustic reflection surfaces 412 and 422 of the reflector 400 are accommodated into the housing 200).

As described above, the display apparatus may detect the user movement to control the turn-on/off of the reflector.

Referring to FIG. 25, the user may execute a user mode displayed on a home screen or a wallpaper of the display apparatus or provided through a separate application (S30). Thereafter, if the user selects one of preset control information provided in the user mode (S32), the display apparatus may control an operation of the reflector, which matches according to the selected control information (S34). The preset control information may include reflector driving mode information by which the reflector is turned on/off, near distance mode information by which sounds are reflected to a near distance, far distance mode information by which sounds are reflected up to a far distance, maximum acoustic emission mode information by which sounds are reflected to output maximum acoustic intensity, minimum acoustic emission mode information by which sounds are reflected to output minimum acoustic intensity, and acoustic reflection mode information according to a user's position, by which a rotation angle of a reflector is adjusted according to the user's position.

As described above, the display apparatus may include a user interface based on user's emotion for controlling the reflector.

Figure 26:
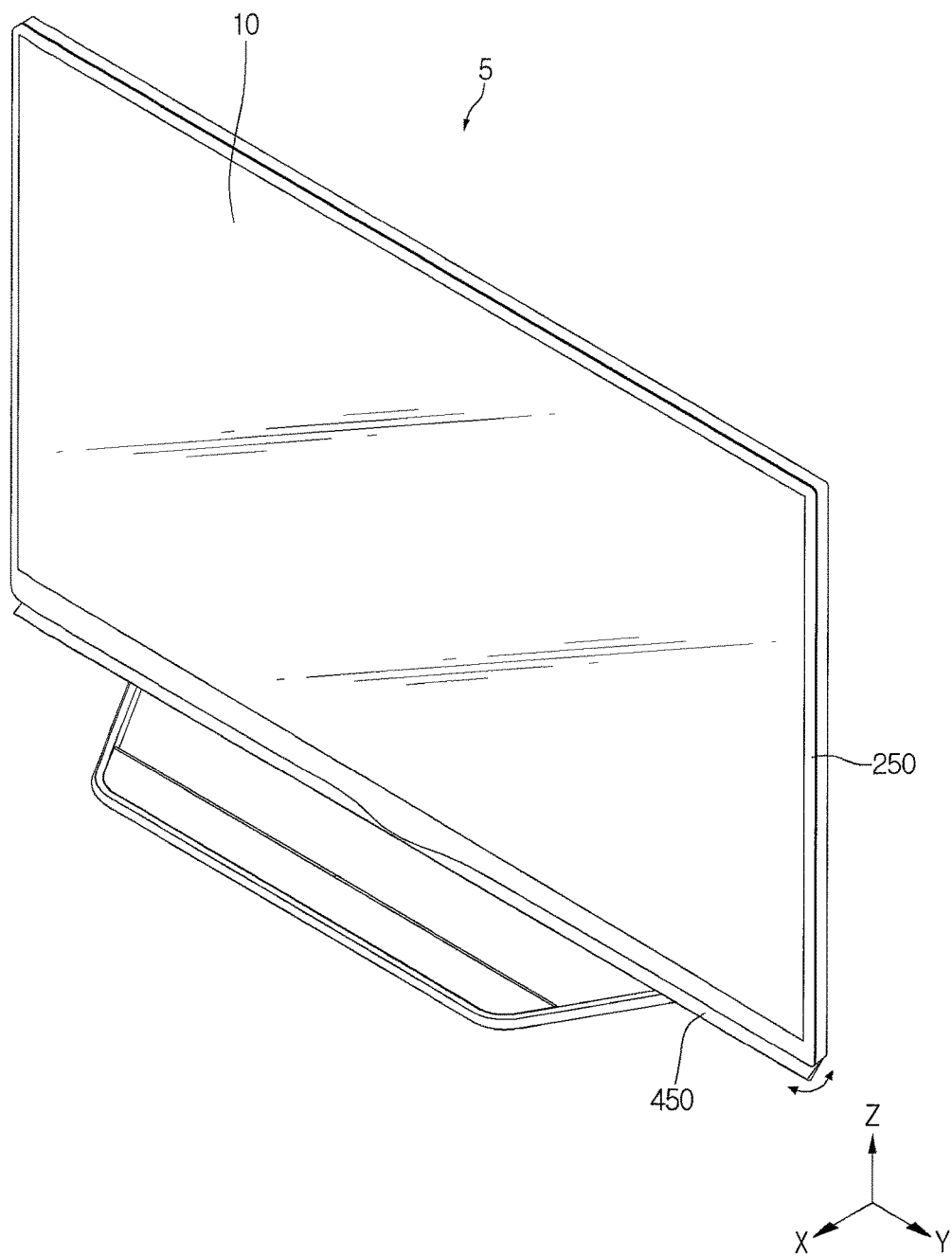
FIG. 26 is a view for explaining a display apparatus according to an example embodiment.

FIG. 26 is a view for explaining a display apparatus according to an example embodiment. Other embodiments and configurations may also be provided.

Since a display apparatus 5 is substantially similar to the display apparatus 4 according to the forgoing example embodiment, a duplicated description with respect to the same constitution may be omitted, and thus different points therebetween may be mainly described.

Referring to FIG. 26, a reflector 450 (of the display apparatus 5) may be rotatably mounted on a front portion of a housing 250. Unlike the foregoing example embodiment, the reflector 450 may be provided as one and may have a long plate shape along a front lower portion of the housing 250. That is, the reflector 450 may not be provided to correspond to the number of speaker modules, but may define a front lower surface of the housing 250, unlike the foregoing example embodiment.

When sounds are not emitted from the speaker module, the reflector 450 may define the front lower surface of the housing 350. On the other hand, when the sounds are emitted from the speaker module, the reflector 450 may rotate downward to reflect the sounds emitted from the speaker module to a front side of the display module 10.

As described above, unlike the foregoing example embodiment, in the display apparatus 5, when the sounds are emitted from the speaker module, the whole front lower side of the housing 250 may be opened through the rotatable reflector 450 that is provided on the whole front lower side of the housing 250.

Figure 27:
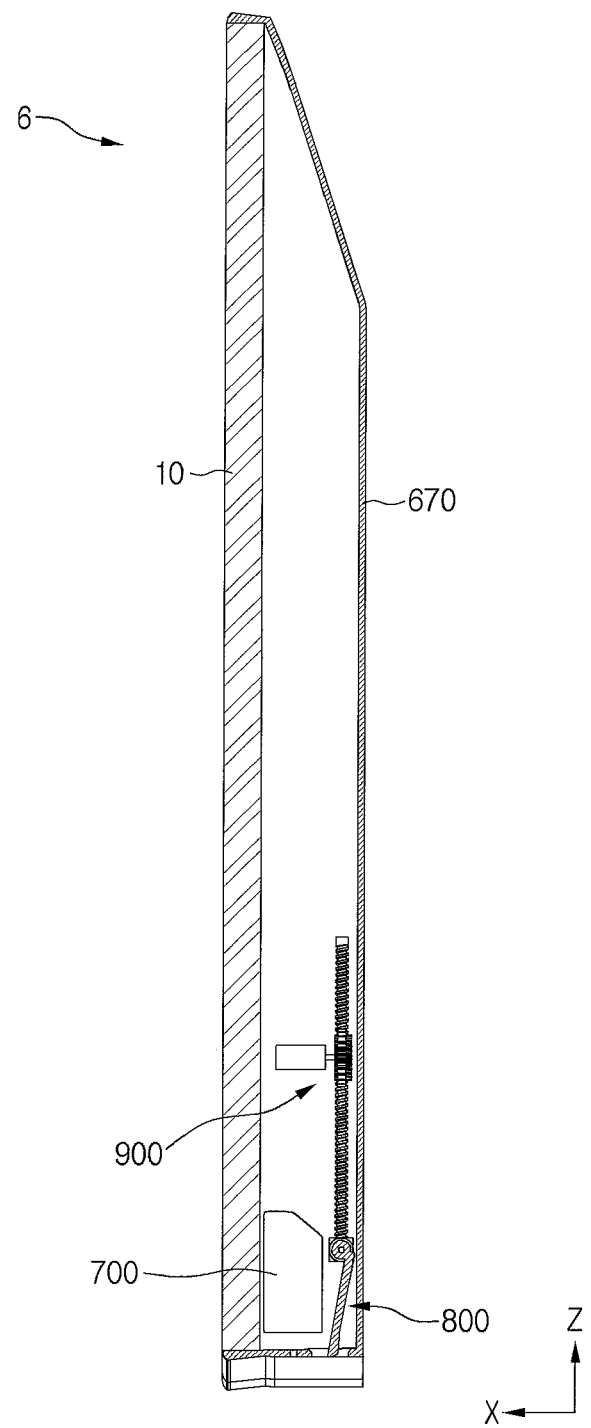
FIG. 27 is a side cross-sectional view of a display apparatus according to an example embodiment.
Figure 28:
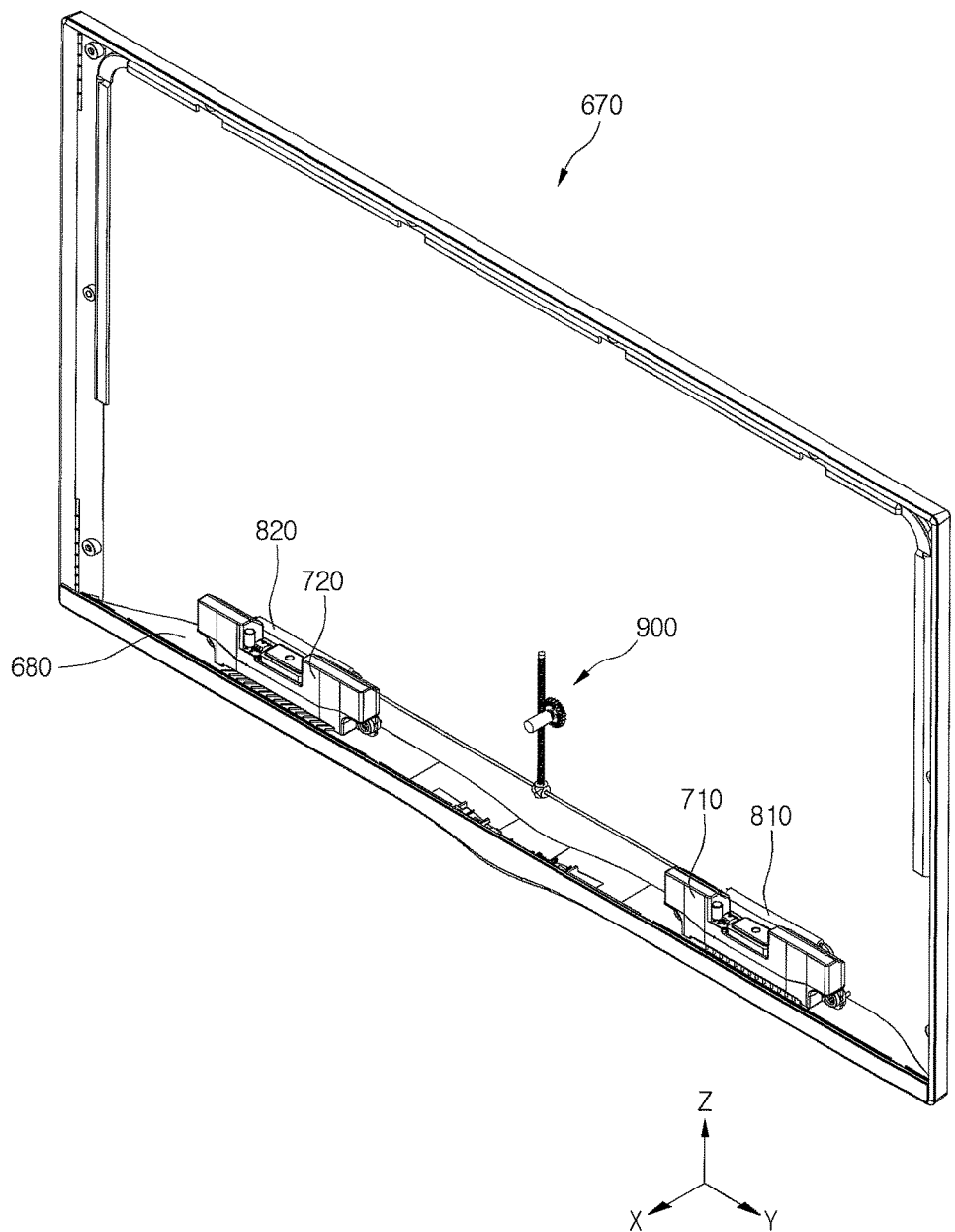
FIG. 28 is a perspective view of the display apparatus of FIG. 27 except for a display module.
Figure 29:
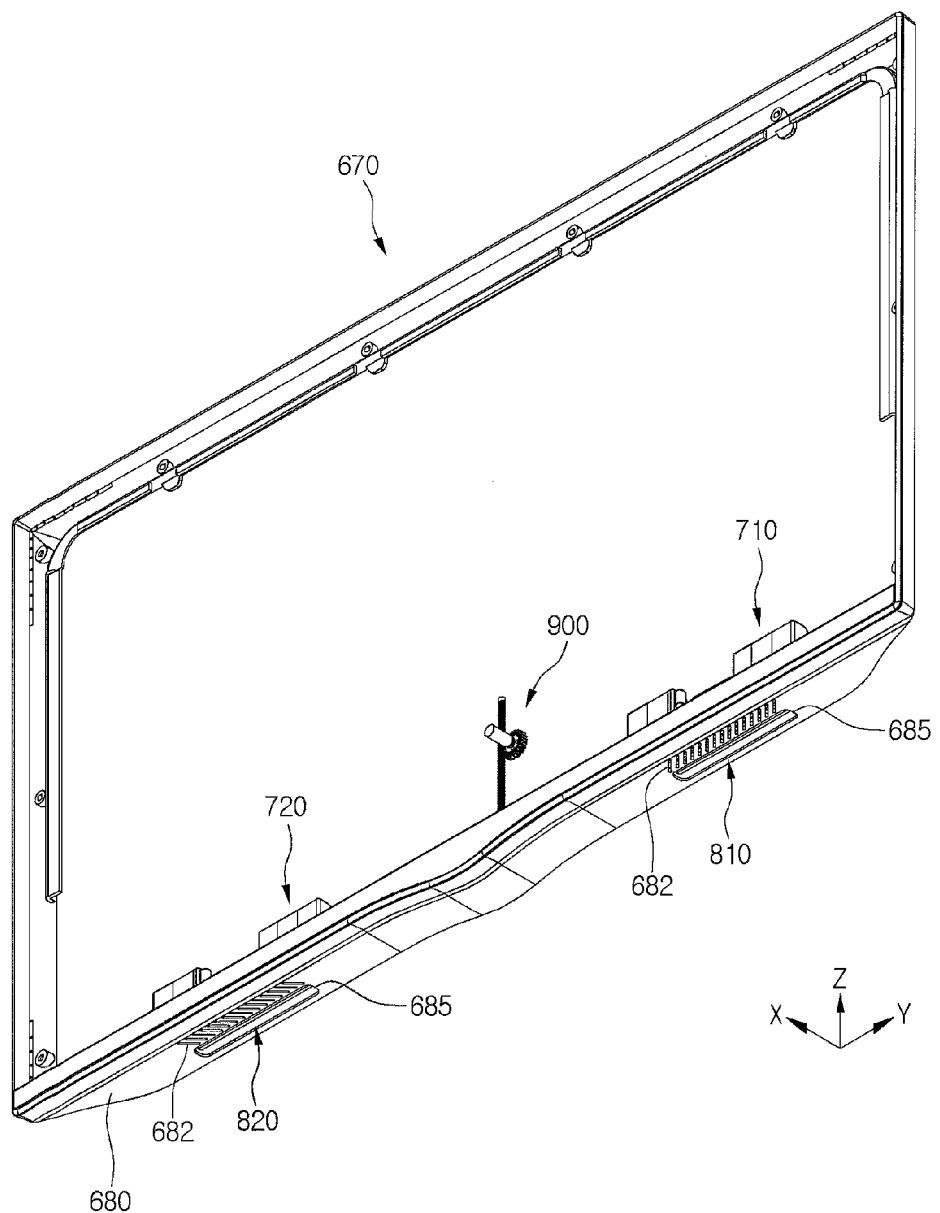
FIG. 29 is a bottom perspective view of the display apparatus of FIG. 27 except for the display module.
Figure 30:
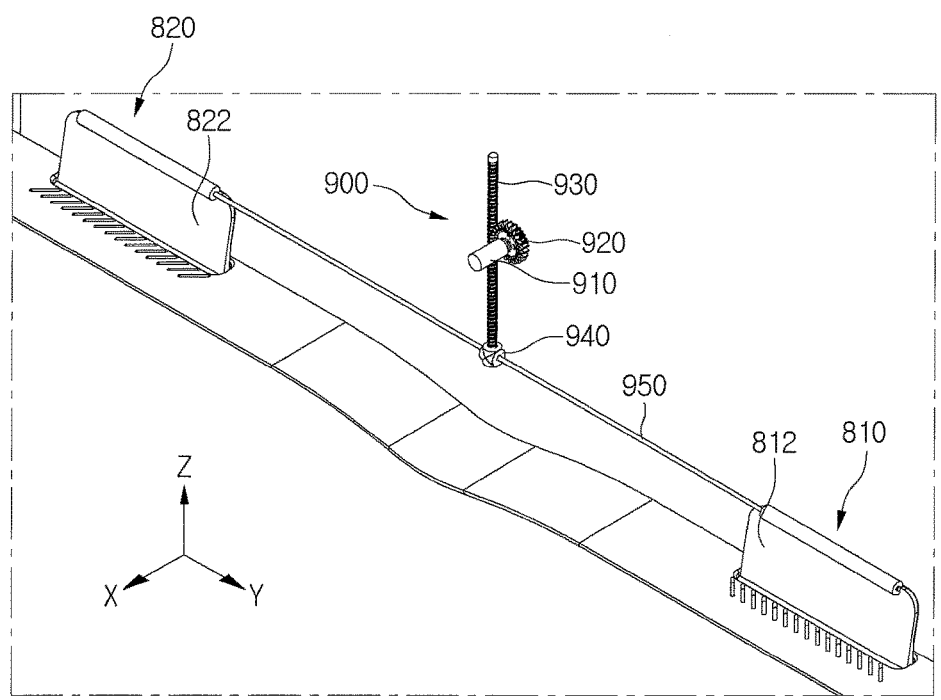
FIG. 30 is a view for explaining a reflector driving unit of the display apparatus of FIG. 27.

FIG. 27 is a side cross-sectional view of a display apparatus according to an example embodiment. FIG. 28 is a perspective view of the display apparatus of FIG. 27 except for a display module. FIG. 29 is a bottom perspective view of the display apparatus of FIG. 27 except for the display module. FIG. 30 is a view for explaining a reflector driving unit of the display apparatus of FIG. 27. Other embodiments and configurations may also be provided.

Since a display apparatus 6 is substantially similar to the display apparatus 4, a duplicated description with respect to the same constitution may be omitted, and thus different points therebetween may be mainly described.

Referring to FIGS. 27 to 30, a display apparatus 6 may include a display module 10, a housing 670, a speaker module 700, a reflector 800, and a reflector driving unit 900.

Since the display module 10 is the same as that according to the foregoing example embodiment, its detailed description may be omitted.

The housing 670 may accommodate the display module 10, the speaker module 700, the reflector driving unit 900, and various components constituting the display apparatus 6. The housing 670 may include a back cover and a border cover, or may be provided as a single member, similar to the foregoing embodiment.

The housing 670 may include an acoustic emission hole 682 and a sliding opening 685.

The acoustic emission hole 682 may be configured to emit sounds emitted from the speaker module 700 to a lower side (a −Z axis direction) of the display apparatus 6. The acoustic emission hole 682 may be defined in a bottom part 680 of the housing 670 and may also be defined in a lower side of the speaker module 700. The acoustic emission hole 682 may be provided to correspond to the number of speaker modules 700. In the current example embodiment, since two speaker modules 710 and 720 are provided, the acoustic emission hole 682 may also be provided in two.

The sliding opening 685 may be defined in the bottom part 680 of the housing 670 to guide sliding of the reflector 800 in a vertical direction (a Z axis direction). The sliding opening 685 may be defined close to the acoustic emission hole 682 at a rear side (a −X axis direction) of the acoustic emission hole 682. The sliding opening 685 may be provided to correspond to the number of reflectors 800. In the current example embodiment, since two reflectors 810 and 820 are provided, the sliding opening 685 may also be provided in two.

An inclination adjustment protrusion (the adjustment protrusion 687 of FIG. 31) for adjusting an inclination angle of each of the reflectors 810 and 820 when the reflectors 810 and 820 are slid may be disposed on each of the sliding openings 685.

The speaker module 700 may include a first speaker module 710 and a second speaker module 720. Since the first and second speaker modules 710 and 720 are the same as that according to the foregoing example embodiment, their detailed descriptions may be omitted.

The reflector 800 may be slidable into/from the housing 670 through the sliding opening 685. The reflector 800 may include a first reflector 810 and a second reflector 820.

The first reflector 810 may have a front surface 812 that serves as an acoustic reflection surface 812. The first reflector 810 may be coupled to a reflector driving unit 900 that may be described below and may be slidable in a vertical direction (a Z axis direction) through the sliding opening 685 defined in a right side of a bottom part 680 of the housing 670. More particularly, the first reflector 810 may be slid along a curved trace between a position at which the acoustic reflection surface 812 is exposed to a front side (a +X axis direction) of the display module 10 and a position at which the acoustic reflection surface 812 is accommodated into the housing 670.

Similar to the foregoing embodiment, a rigid rib may be disposed on a rear surface (the rear surface 814 of FIG. 31) of the first reflector 814. Additionally, similar to the foregoing example embodiment, a diffusion pattern for diffusing sounds may also be disposed on the acoustic reflection surface 810 (of the first reflector 812).

The second reflector 820 may have a front surface 822 that serves as an acoustic reflection surface 822, similar to the first reflector 810. The second reflector 822 may be coupled to the reflector driving unit 900 and may be slidable in the vertical direction (the Z axis direction) through the sliding opening 685 defined in a left side of the bottom part 680 (of the housing 670). More particularly, the second reflector 820 may be slid along a curved trace between a position at which the acoustic reflection surface 822 is exposed to the front side (the +X axis direction) of the display module 10 and a position at which the acoustic reflection surface 822 is accommodated into the housing 670. Further, the second reflector 820 may also include a rigid rib and a diffusion pattern, similar to the first reflector 810.

Similar to the foregoing example embodiment, the position at which the acoustic reflection surfaces 812 and 822 are exposed to the front side (the +X axis direction) of the display module 10 may be defined as a first position, and the position at which each of the acoustic reflection surfaces 812 and 822 is accommodated into the housing 670 may be defined as a second position.

The reflector driving unit may include a driving motor 910, a driving gear 920, a driving shaft 930, a shaft connection member 940, and a reflector connection shaft 950.

Since the driving motor 910 is the same as that according to the foregoing embodiment, its detailed description may be omitted.

The driving gear 920 may be connected to the driving motor 910. The driving gear 920 may rotate with respect to an X-axis according to operation of the driving motor 910 to transmit a driving force for sliding the driving shaft 930 that may be described below. Similar to the foregoing example embodiment, the driving gear 920 may include a worm gear or other gears for transmitting the driving force to other driving shafts 930.

The driving shaft 930 may be gear-coupled to the driving gear 920, and may be disposed in a vertical direction (a Z-axis direction) of the housing 670. The driving shaft 930 may be slid in the vertical direction (the Z-axis direction) as the driving gear 920 rotates.

The shaft connection member 940 may be connected to an end of the driving shaft 930 to connect the driving shaft 930 to the reflector connection shaft 950. Thus, when the driving shaft 930 is slid in the vertical direction (the Z-axis direction), the reflector connection shaft 950 may also be slid in the vertical direction (the Z-axis direction) together with the driving shaft 930.

The reflector connection shaft 950 may be connected to the shaft connection member 940 and may be disposed in a horizontal direction (a Y-axis direction) of the housing 670. When the reflector connection shaft 950 is slid in the vertical direction (the Z-axis direction), the reflector connection shaft 950 may be connected to each of the first and second reflectors 810 and 820 to slide the first and second reflectors 810 and 820 together with each other.

An operation of the reflector 800 of the display apparatus 6 may be described in more detail.

Figure 31:
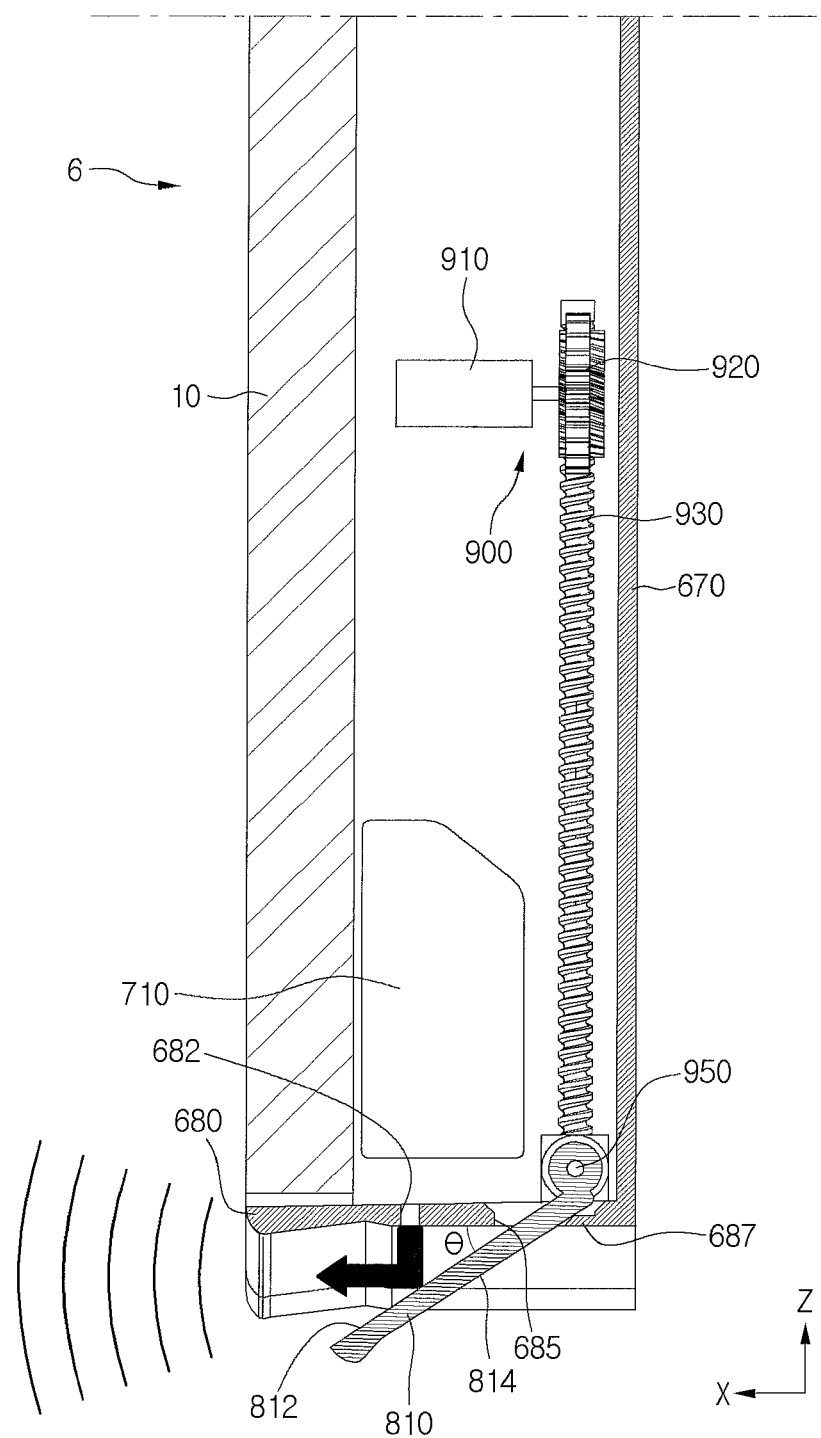
FIGS. 31 and 32 are views for explaining an operation of a reflector of the display apparatus of FIG. 27.
Figure 32:
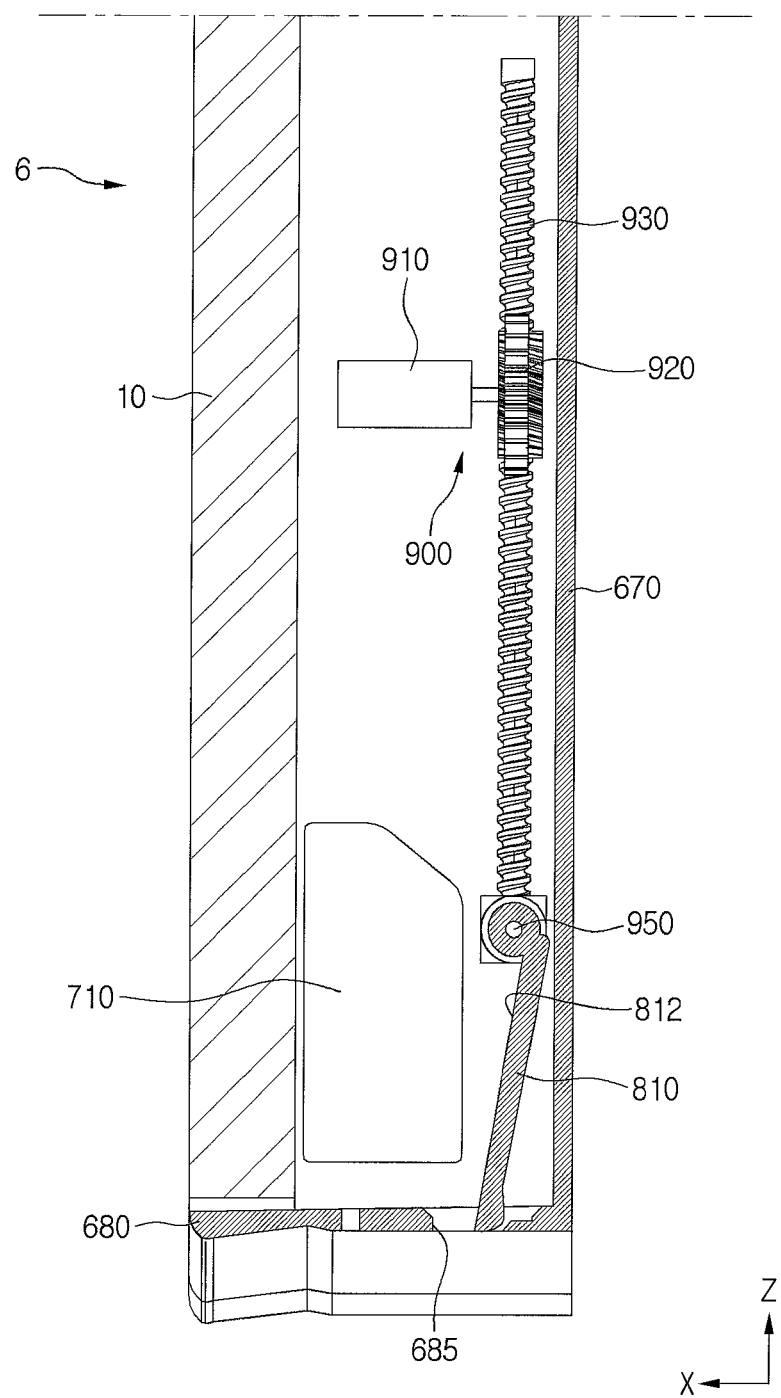

FIGS. 31 and 32 are views for explaining an operation of the reflector of the display apparatus of FIG. 27. Other embodiments and configurations may also be provided.

Like the foregoing embodiment, in the acoustic emission operation of the speaker module 700 and the operation of the reflector 800 for reflecting the sounds emitted from the speaker module 700, since the acoustic emission operation through the second speaker module 720 and the second reflector 820 correspond to that through the first speaker module 710 and the first reflector 810, the acoustic emission operation through the first speaker module 710 and the first reflector 810 may be described as an example.

Referring to FIG. 31, when sounds are emitted from the display apparatus 6, the acoustic reflection surface 812 (of the first reflector 810) may be disposed at the first position. The acoustic reflection surface 812 (of the first reflector 810) may be disposed under the acoustic emission hole 682 so that the sounds emitted from the first speaker module 710 are emitted in the front side (the +X axis direction) of the display module 10.

Further, the first reflector 810 may be designed to have an optimum inclination angle θ, similar to the forgoing embodiment. The optimum inclination angle may be realized by a shape design of the first reflector 810 or a design of the inclination angle adjustment protrusion 687 disposed on the sliding opening 685. For example, the more inclination angle adjustment protrusion 687 further protrudes toward the display module 10, the more the inclination angle θ of the first reflector 810 decreases. Further, the inclination angle adjustment protrusion 687 disposed on the sliding opening 685 for guiding the sliding of the second reflector 810 may be designed through the same method.

In the display apparatus 6, when the sounds are emitted into a lower side (the −Z axis direction) of the housing 670 from the first speaker module 710, the acoustic emission hole 682 by the above-described structure, the emitted sounds may be reflected to the front side (the +X axis direction) of the display module 10 through the first reflector 810 disposed on the lower side (the −Z axis direction) of the acoustic reflection hole 682. Similarly, the second speaker module 720 and the second reflector 820 may operate through the same manner as the first speaker module 710 and the first reflector 810.

Thus, the display apparatus 6 may emit the sounds to the front side (the +X axis direction) of the display apparatus 6.

Referring to FIG. 32, when sounds are not emitted from the display apparatus 6, the acoustic reflection surface 812 of the first reflector 810 may be disposed at the second position. The disposition according to the second position may be realized by an operation of the reflector driving unit 900. In detail, when the driving gear 920 rotates by operation of the driving motor (the driving motor 910 of FIG. 30), the driving shaft 930 may be slid upward (the +Z axis direction) to slide the first reflector 810 connected to the reflector connection shaft 950 upward (the +Z axis direction). The sliding of the first reflector 810 may move along the curved trace as described above.

The first reflector 810 may be slid and accommodated into the housing 670. Thus, the first reflector 810 may not be exposed to outside of the display apparatus 6. Further, the second reflector 820 may also be accommodated into the housing 670, similar to the first reflector 810. Thus, the second reflector 820 may not be exposed to the outside of the display apparatus 6.

On the other hand, when sounds are emitted again from the display apparatus 6, the first and second reflectors 810 and 820 may reversely operate and may thus be disposed at the first position.

As described above, in the display apparatus 6, the reflector 800 may be exposed to outside of the housing 670 or accommodated into the housing 670 through structure of the reflector driving unit 900 that is slid in the vertical direction (the Z axis direction). The structure of the reflector driving unit may be changed into other structures that are capable of moving the reflector between the first position and the second position.

Figure 33:
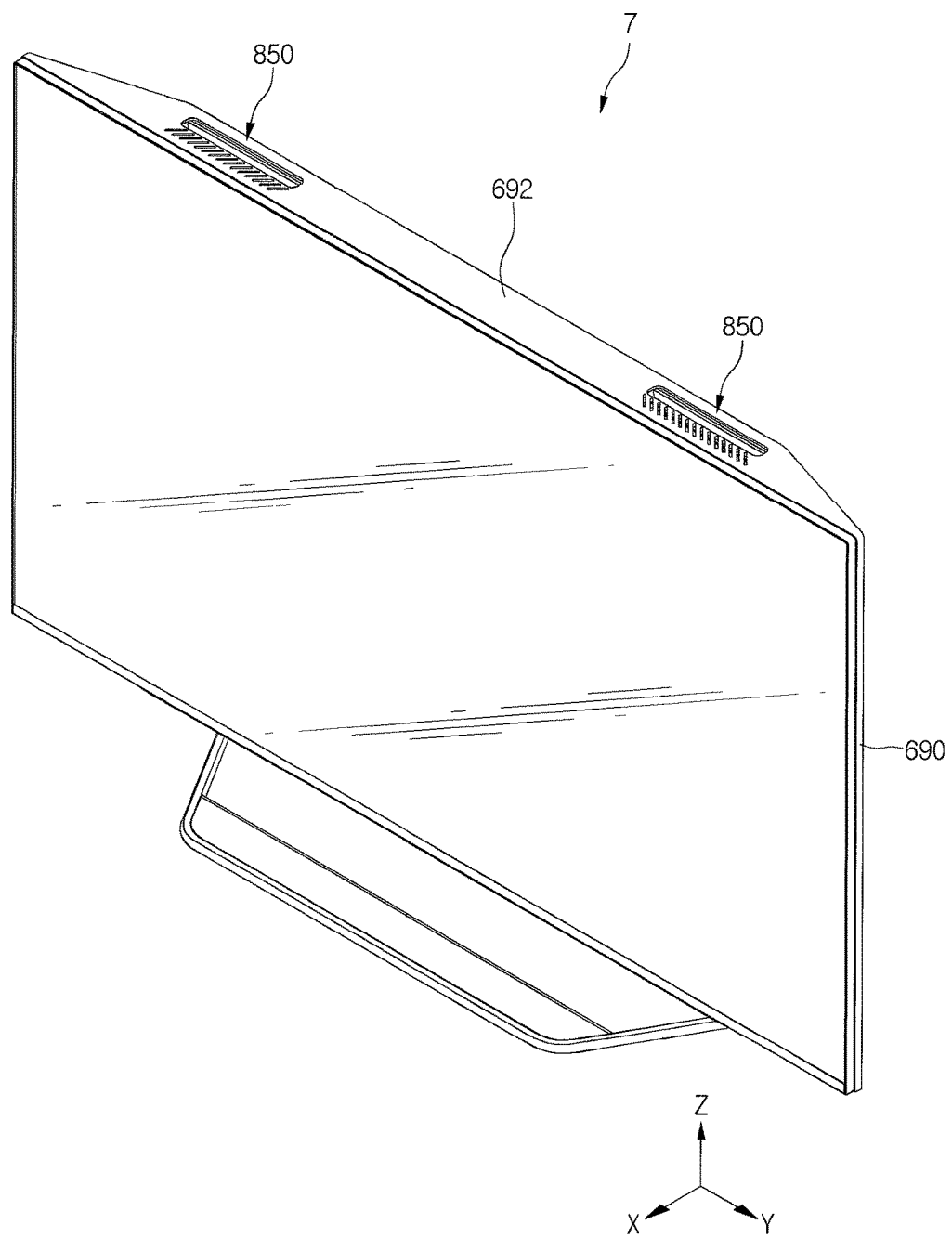
FIGS. 33 and 34 are views for explaining a display apparatus according to an example embodiment.
Figure 34:
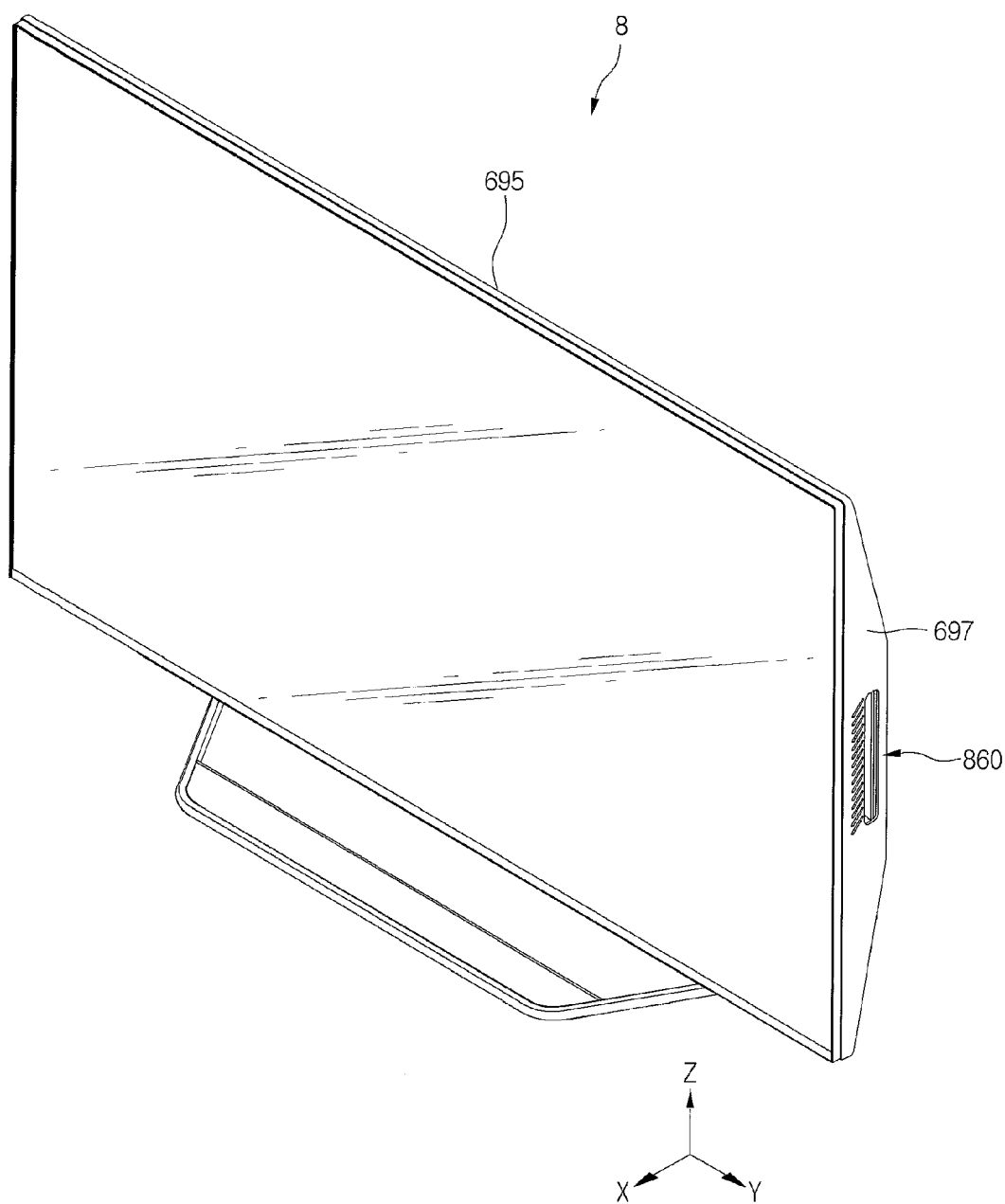

FIGS. 33 and 34 are views for explaining a display apparatus according to example embodiment. Other embodiments and configurations may also be provided.

Since a display apparatuses 7 and 8 are substantially similar to the display apparatus 5, a duplicated description with respect to the same constitution may be omitted, and thus different points therebetween may be mainly described.

Referring to FIG. 33, the display apparatus 7 may include a reflector 850 on a top surface 692 of a housing 690. The reflector 850 may be slid in a vertical direction of the housing 690 or may be rotatably mounted on the top surface 692 of the housing 690 so that the reflector 850 is exposed to outside of the display apparatus 7 at a first position and is accommodated into the display apparatus 7 at a second position. However, embodiments are not limited thereto. For example, the reflector 850 may be changed into other structure that are capable of being slid between a first position and a second position. As described above, the reflector 850 may be movably mounted on the top surface 692 of the housing 690 according to a design thereof.

Referring to FIG. 34, the display apparatus 8 may include a reflector 860 on each of both side surfaces 697 of the housing 695. The reflector 860 may be slidable or rotatable between the first position and the second position. As described above, the reflector 860 may be movably mounted on each of both side surfaces 697 of the housing 695 according to a design thereof.

Embodiments may provide a display apparatus that is improved in beauty and is slimmer.

In at least one embodiment, a display apparatus may include: a display module displaying an image; a housing accommodating the display module; at least one speaker module mounted within the housing, the at least one speaker module being connected to the display module to emit sounds; and at least one reflector disposed adjacent to the at least one speaker module, the at least one reflector having an inclined acoustic reflection surface exposed to a front side of the display module when the sounds are emitted from the at least one speaker module, wherein the at least one speaker module is disposed in parallel to a horizontal direction or a vertical direction of the housing.

The at least one reflector may be disposed to correspond to the at least one speaker module.

Each of the speaker module and the reflector may be provided in plurality.

The plurality of reflectors may be disposed on a front lower side of the display module in the housing, and the plurality of speaker modules may be disposed on a rear side of the display module adjacent to the corresponding reflectors.

The plurality of reflectors may include: a first reflector disposed on one side of the front lower side of the display module; and a second reflector horizontally spaced a predetermined distance from the first reflector, the second reflector being disposed on the other side of the front lower side of the display module.

The plurality of speaker modules may include a first speaker module disposed adjacent to the first reflector and a second speaker module disposed adjacent to the second reflector.

The housing may include a back cover accommodating the display module and the at least one speaker module and a border cover coupled to the back cover, the border cover being disposed on a front side of the back cover, wherein the at least one reflector may be disposed on a bottom part of the border cover.

The back cover may be hook-coupled to the bottom part of the border cover.

The at least one reflector may include at least one rigid rib protruding from a surface opposite to the acoustic reflection surface.

The back cover may include at least one rigid reinforcing rib protruding from a position corresponding to the at least one reflector.

The acoustic reflection surface may be inclined downward from the display module.

The acoustic reflection surface may have an inclination angle of approximately 12°.

A diffusion pattern for diffusing the sounds to the front side of the display module may be disposed on the acoustic reflection surface.

The diffusion pattern may have at least one of a fan shape, a comb shape, a wave shape, and an embossing shape.

Each of the speaker modules and each of the reflectors may be spaced a predetermined distance from each other in the horizontal direction or the vertical direction.

The plurality of reflectors may be disposed on a front upper side or both front sides of the display module in the housing. The plurality of speaker modules may be mounted on a rear side of the display module that is adjacent to the corresponding reflectors.

When the sounds are not emitted from the at least one speaker module, the at least one reflector may be movably disposed to a position at which the acoustic reflection surface is accommodated into the housing.

The display apparatus may further include a reflector driving unit coupled to the at least one reflector to provide a driving force for moving the at least one reflector.

The at least one reflector may be slid along a curved trace between a first position at which the acoustic reflection surface is exposed to the front side of the display module and a second position at which the acoustic reflection surface is accommodated into the housing as the reflection driving unit operates.

The reflector driving unit may include a driving motor mounted on the housing to provide the driving force, and a driving shaft connecting the driving motor to the at least one reflector.

The reflector driving unit may further include a driving gear connecting the driving motor to the driving shaft.

The reflector driving unit may further include a reflector connection shaft connecting the driving shaft to the at least one reflector, and the driving shaft and the reflector connection shaft may be linearly slid as the driving motor operates.

The housing may have at least one sliding opening corresponding to the at least one reflector to slide the at least one reflector.

An inclination angle adjustment protrusion for adjusting an inclination angle of the acoustic reflection surface of the at least one reflector when the at least one reflector is slid may be disposed in the at least one sliding opening.

The housing may have at least one acoustic emission hole in a lower side of the at least one speaker module, and the at least one reflector may be disposed under the at least one acoustic emission hole when the sounds are emitted.

According to the foregoing various embodiments, the display apparatus that is improved in beauty and is slimmer may be provided.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus comprising:
a display module to display an image;
a housing to accommodate the display module;
at least one speaker module provided at the housing, the at least one speaker module to be coupled to the display module;
at least one reflector disposed adjacent to the at least one speaker module, the at least one reflector having an inclined acoustic reflection surface that is exposed to a front side of the display module when sounds are provided from the at least one speaker module; and
a reflector driving unit coupled to the at least one reflector to move the at least one reflector,
wherein when sounds are not provided from the at least one speaker module, the at least one reflector is to be movably disposed to a position such that the acoustic reflection surface is provided in the housing,
wherein the reflector driving unit includes:
a driving motor, at the housing, to provide a driving force to move the at least one reflector;
a driving gear to be connected to the driving motor;
a driving shaft to be coupled to the driving gear; and
a reflector connection shaft to couple the driving shaft to the at least one reflector,
wherein the driving shaft and the reflector connection shaft are coupled perpendicular to each other,
wherein the driving shaft and the reflector connection shaft linearly slid as the driving motor operates.

2. The display apparatus according to claim 1, wherein the at least speaker module is a plurality at speaker modules, and the at least one reflector is a plurality of reflectors.

3. The display apparatus according to claim 2, wherein the plurality of reflectors include:
a first reflector at a first side of a front lower side of the display module; and
a second reflector at a second side of the front lower side of the display module.

4. The display apparatus according to claim 3, wherein the plurality of speaker modules include:

a first speaker module at a rear side of the display module adjacent to the first reflector; and
a second speaker module at the rear side of the display module adjacent to the second reflector.

5. The display apparatus according to claim 1, wherein the housing includes:
a back cover to accommodate the display module and the at least one speaker module; and
a border cover to couple to the back cover, the border cover being at a front side of the back cover,
wherein the at least one reflector is at a bottom part of the border cover.

6. The display apparatus according to claim 5, wherein the back cover includes at least one rigid reinforcing rib to protrude from a position corresponding to the at least one reflector.

7. The display apparatus according to claim 1, wherein the at least one reflector includes at least one rigid rib to protrude from a surface opposite to the acoustic reflection surface.

8. The display apparatus according to claim 1, wherein the acoustic reflection surface is inclined downward from the display module.

9. The display apparatus according to claim 8, wherein the acoustic reflection surface has an inclination angle of approximately 12°.

10. The display apparatus according to claim 1, wherein a diffusion pattern for diffusing sounds to the front side of the display module is disposed on the acoustic reflection surface.

11. The display apparatus according to claim 10, wherein the diffusion pattern has one of a fan shape, a comb shape, a wave shape, and an embossing shape.

12. The display apparatus according to claim 1, wherein the at least one reflector is slid along a curved trace between a first position at which the acoustic reflection surface is exposed to the front side of the display module and a second position at which the acoustic reflection surface is provided in the housing as the reflection driving unit operates.

13. The display apparatus according to claim 1, wherein the housing has at least one sliding opening corresponding to the at least one reflector to slide the at least one reflector.

14. The display apparatus according to claim 13, wherein an inclination angle adjustment protrusion for adjusting an inclination angle of the acoustic reflection surface of the at least one reflector when the at least one reflector is slid is disposed at the at least one sliding opening.

15. The display apparatus according to claim 13, wherein the housing has at least one acoustic emission hole in a lower side of the at least one speaker module, and
the at least one reflector is disposed under the at least one acoustic emission hole when the sounds are provided from the at least one speaker module.

16. A display apparatus comprising:
a display module;
a housing to accommodate the display module;
a first speaker module at the housing;
a second speaker module at the housing;
a first reflector adjacent to the first speaker module, the first reflector having an inclined acoustic reflection surface that is inclined downward from the first speaker module and is exposed to a front of the display module when sounds are provided from the first speaker module;
a second reflector adjacent to the second speaker module, the second reflector having an inclined acoustic reflection surface that is inclined downward from the second speaker module and is exposed to a front of the display module when sounds are provided from the second speaker module; and a reflector driving unit coupled to the first and second reflectors to move the first and second reflectors, wherein when sounds are not provided from the first and second speaker modules, the first and second reflectors are to be movably disposed to a position such that the acoustic reflection surface is provided in the housing, wherein the reflector driving unit includes:
- a driving motor, at the housing, to provide a driving force to move the first and second reflectors;
- a driving gear to be connected to the driving motor;
- a driving shaft to be coupled to the driving gear; and
- a reflector connection shaft to couple the driving shaft to the first and second reflectors,
- wherein the driving shaft and the reflector connection shaft are coupled perpendicular to each other,
- wherein the driving shaft and the reflector connection shaft linearly slid as the driving motor operates.

17. The display apparatus according to claim 16, wherein the first and second reflectors are on a front lower side of the display module, and the first and second speaker modules are on a rear of the display module adjacent to the corresponding reflectors.

18. The display apparatus according to claim 16, wherein the housing comprises:
- a back cover to accommodate the display module and the first and second speaker modules; and
- a border cover to couple to the back cover, the border cover being at a front of the back cover,
- wherein the first and second reflectors are on a bottom of the border cover.

19. The display apparatus according to claim 18, wherein the back cover includes at least one rigid reinforcing rib to protrude from a position corresponding to the first reflector.

20. The display apparatus according to claim 16, wherein the first reflector includes at least one rigid rib to protrude from a surface opposite to the acoustic reflection surface.

21. The display apparatus according to claim 16, wherein a diffusion pattern is provided on the acoustic reflection surface.

* * * * *